(12) United States Patent  (10) Patent No.: US 7,567,355 B2
Matsunoshita  (45) Date of Patent: Jul. 28, 2009

(54) IMAGE READER AND COPIER PREVENTING UNAUTHORIZED READING AND COPYING

(75) Inventor: Junichi Matsunoshita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 825 days.

(21) Appl. No.: 10/238,006

(22) Filed: Sep. 10, 2002

(65) Prior Publication Data

US 2003/0179399 A1 Sep. 25, 2003

(30) Foreign Application Priority Data

Mar. 20, 2002 (JP) ............................ P2002-079387

(51) Int. Cl.
*G06F 3/12* (2006.01)

(52) U.S. Cl. ..................... 358/1.13; 358/3.26; 358/406; 382/100; 713/176

(58) Field of Classification Search ................ 358/1.13, 358/406, 3.28; 713/176; 382/100
See application file for complete search history.

(56) References Cited

U.S. PATENT DOCUMENTS

| | | | | | |
|---|---|---|---|---|---|
| 5,752,152 | A | * | 5/1998 | Gasper et al. | 399/366 |
| 5,798,844 | A | * | 8/1998 | Sakano et al. | 358/405 |
| 5,982,956 | A | * | 11/1999 | Lahmi | 382/306 |
| 6,116,510 | A | * | 9/2000 | Nishino | 235/494 |
| 6,279,830 | B1 | * | 8/2001 | Ishibashi | 235/494 |
| 6,533,182 | B1 | * | 3/2003 | Ohshima et al. | 235/494 |
| 6,711,277 | B1 | * | 3/2004 | Cok | 382/100 |
| 2001/0026629 | A1 | * | 10/2001 | Oki | 382/100 |
| 2002/0018228 | A1 | * | 2/2002 | Torigoe | 358/1.14 |

FOREIGN PATENT DOCUMENTS

| | | |
|---|---|---|
| JP | 7-231384 | 8/1995 |
| JP | 11-046265 | 2/1999 |
| JP | 11-355557 | 12/1999 |
| JP | 2000-076458 | 3/2000 |
| JP | 2000-287081 | 10/2000 |
| JP | 2001-189855 | 7/2001 |
| JP | 2001-346032 | 12/2001 |

* cited by examiner

*Primary Examiner*—Twyler L Haskins
*Assistant Examiner*—Jacky X Zheng
(74) *Attorney, Agent, or Firm*—Morgan, Lewis & Bockius LLP

(57) ABSTRACT

An image, in which a pattern image is arranged so as to express a control information for inhibiting copying or for removing the inhibition, is defined as an image to be read. A copy inhibition code or a condition code for removing the inhibition is assigned for the pattern image. In a "normal copy mode" of a copier, a copy inhibition information detecting part detects the copy inhibition code in an obtained image, and a controller halts the copying when the copy inhibition code is detected. A condition information detecting part detects the condition code in the obtained image. A copy mode is provided in which the copying operation is permitted when the condition matches. The controller permits copying when a condition, such as permitting a specific user to perform copying or the elapse of a predetermined day and time delimited period, is established.

8 Claims, 17 Drawing Sheets

FIG. 5 (A)
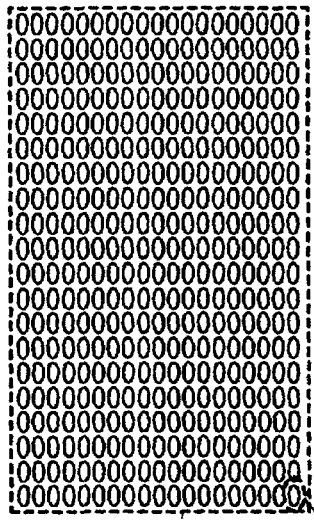
UNIT TWO-DIMENSIONAL ARRAY
(20 x 20 PATTERN IMAGE)
FIG. 5 (B)
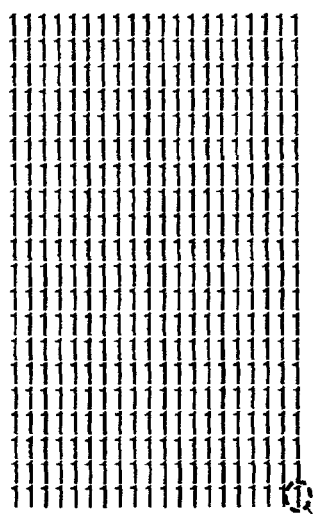
FIG. 5 (C)
REPRESENTING BY
ARRAY OF "0" AND "1"
FIG. 5 (D)
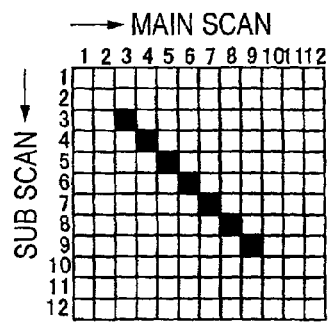
(3,3) (4,4) (5,5) (6,6)
(7,7) (8,8) (9,9)
FIG. 5 (E)
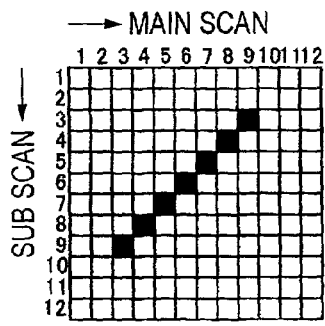
(3,9) (4,8) (5,7) (6,6)
(7,5) (8,4) (9,3)
FIG. 5 (F)
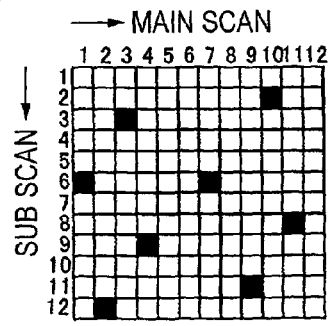
(1,6) (2,12) (3,3) (4,9)
(7,6) (9,11) (10,2) (11,8)
(LATENT IMAGE PART)

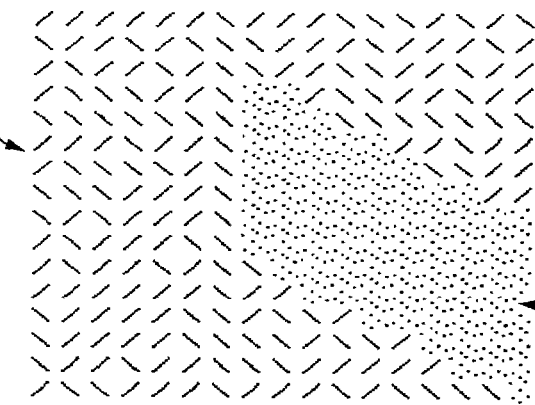
FIG. 6 (C) ENLARGES A PART OF BACKGROUND IMAGE — CONDITION CODE PART, LATENT IMAGE PART
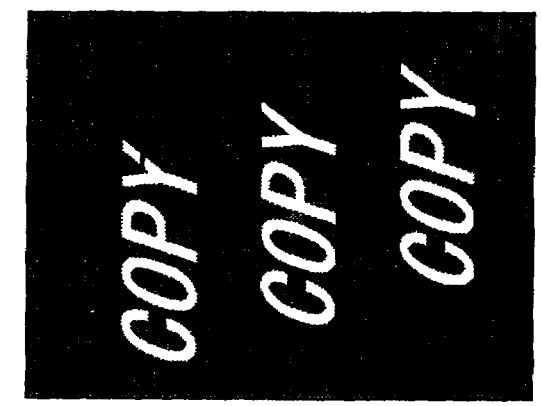
FIG. 6 (B) PRINTED OUT IMAGE
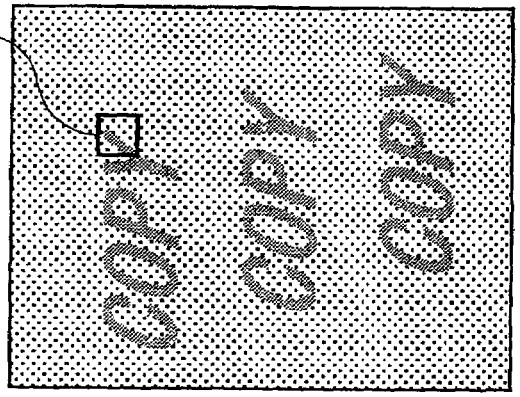
FIG. 6 (A) BACKGROUND IMAGE — PART TO BE ENLARGED PATTERN HAVING FEATURE QUANTITY EXPRESSED BY COMBINATION OF LINEAR FUNCTION AND QUADRATIC FUNCTION

FIGURE PRESENTING LINEAR LINE, SQUARE AND CIRCLE OR ELLIPSIS

IMAGE READER AND COPIER PREVENTING UNAUTHORIZED READING AND COPYING

BACKGROUND OF THE INVENTION

1. Field of the Invention

The present invention relates to an image reader and a copier. More particularly, the invention relates to a technique for inhibiting the unauthorized copy of a document of which the unauthorized copying is inhibited when the document image is read.

2. Description of the Related Art

Recently, the image forming apparatus having a copying function, such as a personal computer, printer and copying machine, is in wide spread. Accordingly, it is very easy to copy documents. In this circumstance, even a copyrighted document or a document with the unauthorized copy prohibition mark, such as "copy inhibition", "copy forbidden" or "confidential" (those documents will be referred to as "confidential documents") is easily copied. There is an original document, called "confidential document", of the type which contains character strings, graphics, tables, graphs, etc., and important information to be prevented from being leaked. Recently, this type of document is copied in an unauthorized manner, and the important information (confidential content) of the document is leaked. This information leakage becomes problematic. Accordingly, the image forming apparatus with the copying function must be given the function to prohibit the fraudulent copy of the confidential document.

To prohibit voluntary and arbitrary copying operations of confidential documents or to permit the copying operations within fixed limits, various techniques have been proposed. Those techniques may be classified into the following techniques. A first technique is that the confidential document may be copied, but the quality of the resultant copy is extremely poor. A second technique is that the confidential document is printed on a copy/forgery protect sheet. In a third technique, a pattern image hard to see by the human eye or a copy prohibition mark, e.g., "copy prohibition", is printed in a copy prohibiting area. The pattern or mark is registered in advance. When the document is read, the mark is detected, and the detected one is compared with the registered mark or pattern. When those are coincident with each other, the copying operation is controlled.

A conventional art for the control of the illicit copying of the confidential document is disclosed in Japanese Patent Laid-Open No. 231384/1995. In the publication, a pattern image having a function equivalent to that of the copy/forgery protect sheet is generated by the image processing technique. The copy/forgery protect sheet is a sheet having a special pattern image previously printed thereon. The special pattern is hard to see by the human eye, but it comes forth into view on the sheet when it is copied by the copying machine. When a document printed on the copy/forgery protect sheet is copied by the copying machine, warning characters, e.g., "copy inhibition", appears on the copied sheet. As a result, psychological deterrent acts on the illicit copying act, and one can distinguish between the original and the copied sheet.

In the Japanese Patent Laid-Open No. 231384/1995, the warning character part and the background part, which is dither processed at a specific common density, are superinterposed, whereby a pattern image, which produces an effect equivalent to that by an anticopy/counterfeit sheet, is composed with the input image data, whereby the effect equivalent to that by the copy/forgery preventing sheet is produced using a normal sheet.

In this technique, when it is copied by using the copying machine, the warning characters emerges on the background of the copied sheet. Accordingly, the illicit copying act is psychologically deterred. However, the illicit copying act preventing technique cannot inhibit the copying act per se. In this sense, the technique fails to prevent the illicit copy.

A technique to solve this problem is proposed. In the technique, copy inhibition information is embedded in advance in the confidential document. The copying machine detects the copy inhibition information from the image as read, and controls the copying operation in accordance with the read information. The technique is disclosed in Japanese Patent Laid-Open Nos. 2000-76458, 2001-189855, 2001-346032 or others.

In Japanese Patent Laid-Open No. 2000-76458, there is disclosed a technique in which the copying machine recognizes a specific symbol attached to a copy-inhibited document. In other words, the copying machine is given the function of recognizing the specific symbol, thereby inhibiting the illicitly copying of the copy-inhibited document.

In Japanese Patent Laid-Open No. 2001-189855, copy inhibition information and/or information to permit the user to copy if special conditions are satisfied are embedded in a document to be printed out by using the bar code or electronic watermark technique. The copying operation is controlled in accordance with those pieces of information detected.

In Japanese Patent Laid-Open No. 2001-346032, two-dimensional codes are embedded in the background of the copy/forgery protect sheet. In this technique, the copy inhibition information may be contained in the two-dimensional codes of the background. The copying machine is given the function of detect the two-dimensional information. If the copy inhibition information is contained in the two-dimensional codes, the copying operation is stopped. In this way, it is possible to prevent information of the confidential document from being leaked by the illicit copying.

The conventional techniques involve the following problems, however. The technique of judging as to if the copying operation is to be stopped upon the recognition of the specific symbol as disclosed in Japanese Patent Laid-Open No. 2000-76458, cannot perform such high level copying operation controls as to permit a specific user to copy for each document, and to permit the user to copy the document after predetermined date and time are past.

In the technique of embedding copy inhibition information by using the electronic watermark technique as disclosed in Japanese Patent Laid-Open No. 2001-189855, the electronic watermark easily becomes unrecognizable through the copy generation (copying repeated a plurality of times). In other words, the watermark is easily deleted by the hard copying operation. Accordingly, the information embedded by the electronic watermark technique disappears. As a result, it becomes unknown whether or not the document is the confidential document.

Any of the publications mentioned above can deter the user from illicitly copying the confidential document, but cannot prevent the illicit copying act completely. To ensure the prevention of the illicit copying, the copying machine must be given the function to recognize that an object to be copied put on the machine is a confidential document of which the copying is inhibited, and to control the copying operation. The function of detecting the copy inhibition mark, bar code and the like may be realized by a relatively simple technique. Accordingly, it is not difficult to incorporate this function to all the copying machines.

To realize the function of detecting the electronic watermark, however, it is necessary to use relatively large scale process and high level technique. The realizing of its function is costly. Specifically, the following processes must be used: skew correction process, code data positioning process, process to detect a dot pattern embedded as a latent image in the image (electronic watermark detecting process), error correction process for increasing the judgement accuracy, and the like. For this reason, the current actual circumstance is that most of the machines are not provided with the electronic watermark detecting function. This tendency is found also in the case of the two-dimensional code. In this circumstance, also when the confidential document is copied by the copying machine not having the function to detect the two-dimensional code or the electronic watermark, the information as embedded in the form of the two-dimensional code or the electronic watermark disappears. As a result, even the fact that the document is the confidential document becomes unknown.

In the techniques of Japanese Patent Laid-Open No. 2000-76458 or Nos. 2001-189855 and 2001-346032, copy inhibition information is embedded in the form of the special symbol, or the bar code or two-dimensional code. And, the copy inhibition information is located on the white background part in a state that it is visible to the human eye. Accordingly, the user can clearly see a place of the copy inhibition information in the document. When a user with malice easily removes (hides, paints out, cuts out) the part of the document containing such copy inhibition information as bar code embedded therein, the document is printed out without stopping the copying operation. It is impossible to prevent the secret information from being leaked outside. In this case, the special symbol or the bar code which is indicative of the confidential document is invalid for the copying machine. This results in that security protection depends only on the morals of the user.

In the techniques of Japanese Patent Laid-Open Nos. 2001-189855 and 2001-346032, judgement as to if the copying operation is to be stopped or permitted is not made till the electronic watermark or bar code embedded in the document. High level detection/judgement process, such as the skew correction process, is required for the detection of the electronic watermark or bar code, as described above. Accordingly, long processing time is consumed, and an efficiency of copy reproduction is lowered.

SUMMARY OF THE INVENTION

Accordingly, an object of the present invention is to provide an image reader or a copier in which when an image of a document of which the unauthorized copy is prohibited is read, a printed out matter is more reliably prevented from being copied in unauthorized manner without using high level detection/judgement process.

To achieve this objective, according to the present invention, there is provided a first image reader for reading a document that includes plural kinds of specific pattern images and for controlling the output of an image that is read, including: an image reading part for reading the document; an inhibition information detecting part for detecting inhibition information that is included in the image obtained by the image reading part and that represents the inhibition of the output of the image; a condition information detecting part for detecting condition information that is included in the image obtained by the image reading part and that removes the inhibition of the output of the image; and a mode instruction part for instructing a switch between a normal operating mode and a condition operating mode.

In addition, the first image reader further includes: a removing condition judgement part for judging whether a condition represented by the condition information that is detected by the condition information detecting part matches a condition that is defined in advance to remove the inhibition of the output of an image that is read; and a controller for, in the normal operating mode, permitting the condition information detecting part not to detect the condition information, and prohibiting the output of the image under a condition in which the inhibition information detecting part has detected the inhibition information, and for, in the condition operating mode, permitting the condition information detecting part to detect the condition information, and for permitting the output of the image under a condition in which the removing condition judgement part has ascertained that the condition represented in the condition information detected by the condition information detecting part satisfies the condition that is defined in advance for removing the prohibition of the output of the image.

According to the present invention, there is provided a second image reader for reading a document including plural kinds of specific pattern images and for controlling the output of an image that is read, including: an image reading part for reading a document; an inhibition information detecting part for detecting inhibition information that is included in the image obtained by the image reader and that represents the inhibition of the output of an image; and a condition information detecting part for detecting condition information that is included in the image obtained by the image reading part to remove the inhibition of the output of an image that is read.

The second image reader further includes: a removing condition judgement part for judging whether a condition represented in the condition information detected by the condition information detecting part satisfies a condition that is defined in advance to remove the inhibition of the output of an image; and a controller for, regardless of whether warranted by the detection of the condition information by the condition information detecting part, permitting the output of an obtained image under a condition in which the inhibition information is not detected by the inhibition information detecting part, and for permitting the output of the image under a condition in which the removing condition judgement part has judged that, while the inhibition information is detected by the inhibition information detecting part, a condition represented by the condition information detected by the condition information detecting part satisfies a condition that is defined in advance to remove the prohibition of the output of the image.

For further advantageous embodiments of the invention, reference is made to the detailed description of the present invention.

Furthermore, according to the present invention, there is provided a copier including: a first or a second image reader of the invention; and an image formation part for forming a visible image based on an image read by the image reader, wherein, based on the detection results obtained by the inhibition information detecting part and condition information detecting part, the controller controls at least either the reading operation of the image reader or the image forming operation of the image formation part. When copying is permitted, the operations of both the image reader and the image formation part are permitted. When copying is not permitted, the reading operation currently being performed by the image reader is halted, or the operation of the image formation part need only be halted after the reading has been completed, so that the acquisition can be prevented of the final results, i.e., the printed matter.

The copier of the invention may be either a copier wherein the image reader and the image formation part are integrally formed, or a copier wherein they are separately provided. When the image reader and the image formation part are separately provided, they may either be located near each other, or at remote areas within the network connection.

According to the first and the second image readers, code data that can be detected during a copying operation using the image reader are correlated with a pattern image, and a synthesized image, obtained by synthesizing the original image and the background image in which the pattern image is arranged, is employed as an image to be read, so that control information used to prohibit the copying or to remove that inhibition can be represented. The data for controlling the coping operation, such as code for prohibiting copying and code for removing the inhibition, are allocated for the pattern image.

The first image reader is so designed that the normal operating mode and the condition operation mode can be switched. In the normal operating mode, the controller permits only the inhibition information detecting part to be operated, and prohibits copying under a condition in which the copy inhibition information have been detected by the inhibition information detecting part. Whereas in the condition operating mode, the controller permits only the condition information detecting part to be operated, and permits copying only within a range in which a condition represented by the condition information detected by the inhibition information detecting part satisfies a condition that is defined in advance for removing the copying prohibition.

For the second image reader, when the copy inhibition information is not detected by the inhibition information detecting part, the controller permits copying regardless of the operation performed by the condition information detecting part to detect condition information. When, however, the copy inhibition information has been detected by the inhibition information detecting part, the controller permits copying only within a range in which a condition represented by the condition information detected by the inhibition information detecting part satisfies a condition that is defined in advance for removing the copying inhibition.

BRIEF DESCRIPTION OF THE DRAWINGS

FIGS. 5(A) to 5(F) exemplarily show the code data which may be detected when the copying operation is performed by using a predetermined machine, and pattern data made to correspond to the code data;

FIGS. 6(A) to 6(C) are diagrams showing an example of a background image, which is generated by combining and arranging pattern images as mentioned above, and printed out;

DETAILED DESCRIPTION OF THE PREFERRED EMBODIMENTS

The preferred embodiments of the present invention will be described in detail with reference to the accompanying drawings.

Figure 1:
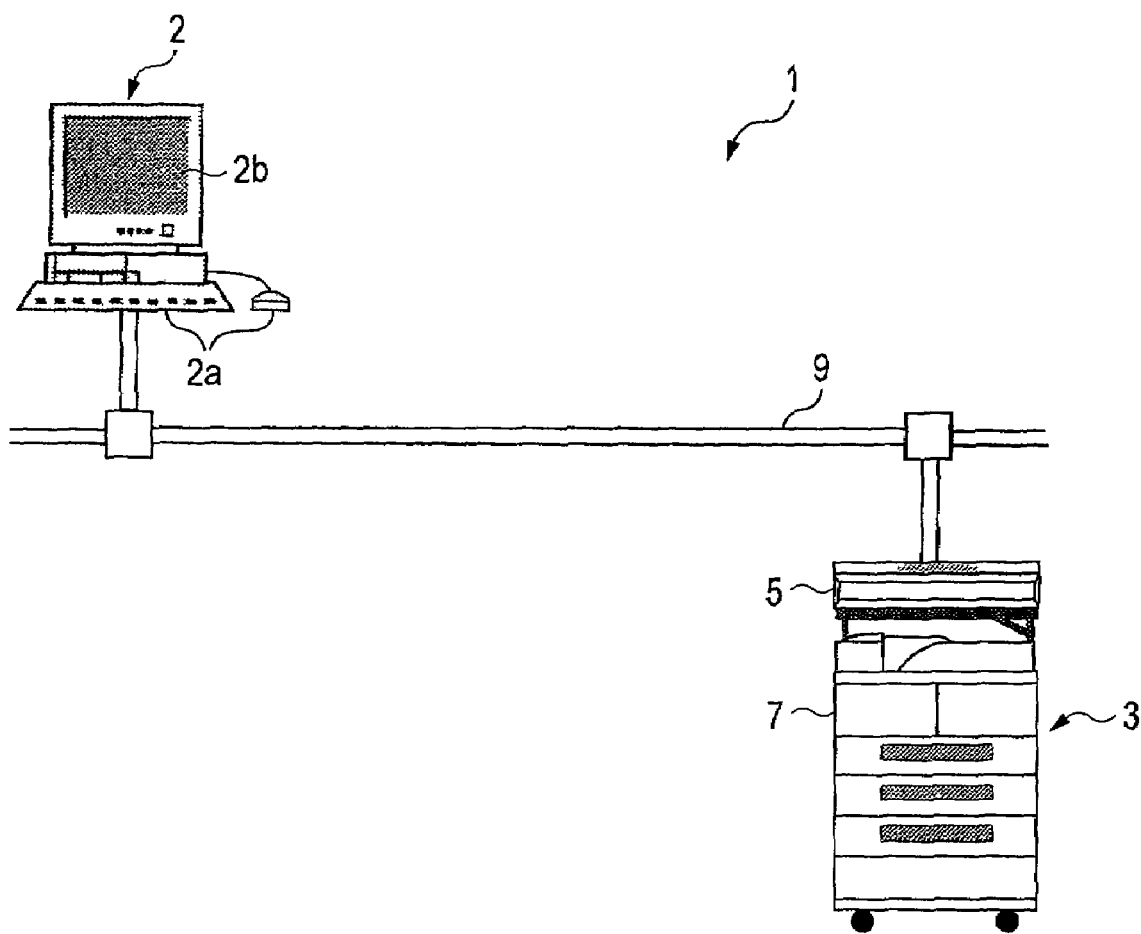
FIG. 1 is a diagram showing an overall arrangement of an embodiment of an image formation system into which an image reader of the invention is incorporated.

FIG. 1 is a diagram showing an overall arrangement of an embodiment of an image formation system into which an image reader and a copier of the invention is incorporated. In the image formation system designated by reference numeral 1, a client terminal 2 which outputs a foreground image as an example of an original image and a complex machine 3 having a printing function and a copying function are connected via a network 9 such as a public communication network, e.g., the Internet, or a private line. The number of the client terminal 2 connected to the network is not limited to one, but may be plural. The copying function includes an image scanning function and an image forming function for forming an image based on an image obtained by the image scanning function.

The client terminal 2 may have a function of generating image information, e.g., a personal computer or a word processor. The complex machine 3 includes a scanner part 5 for reading an image, and a printer part 7 of the raster scan (ROS) type which prints out the image on a given recording sheet.

The image formation system 1 takes a form of called network printer in which the client terminal 2 located at a user side transmits image data to the complex machine 3, and the complex machine 3 responsively prints out the image. For example, a user operates the client terminal 2 to issue a print command to the complex machine 3. At this time, the user selects and inputs added information to be embedded in a document to be printed by operating an input device 2a such as a keyboard or a computer mouse, while watching a menu screen which is displayed on a display device 2b of the terminal by a printer driver having been installed in the client terminal 2.

The added information may include control information for controlling the copying operation, such as copy inhibition information, condition information and latent image information. The copy inhibition information is information for inhibiting a copying machine (including the complex machine 3) from copying a document of which the printing out is instructed. The condition information is information indicative of condition to permit the copying of the printing-out instructed document. The condition information contains a password (PIN code), user ID number (employee number) of the user who is permitted to copy the document, date and time at which the copy inhibition is removed, machine numbers of copying machines which are permitted to copy, and the like. The latent image information is information of latent image characters which are embedded in a background image. The background image will be described later.

A user selects those information and then issues a print command. Upon receipt of the command, the printer driver converts document data (application data) into predetermined print data described in print description language, imparts the added information to a header part of the print data, and then transmits the resultant data to the complex machine 3 via the network 9. The print data is preferably the data described in a page description language (PDL), for example, which allows one to control, as desired, enlargement, rotation, modification and the like of graphics, characters, etc. In the description below, the PDL data is used for the print data.

The following information is added as added information to the header part of the PDL data: an IP address of the client terminal 2 which has transmitted the print job, a user name who has transmitted the print job, a name of a document file to be printed, a time stamp of the document to be printed, a secrecy level set for the document file, encoded information such as a password set for the document file, and latent image information of latent image character strings to be embedded as a latent image. Those added information are attached only to a confidential document or the like which requires copy inhibition.

To start, the complex machine 3 checks the received PDL data. When at least one of the copy inhibition information, condition information and the latent image information is contained in the received data, the complex machine generates a background image in which predetermined pattern images are two-dimensionally arrayed according to predetermined rules, composes the background image and a document image (original image) generated from the PDL data, and prints out the resultant image. When neither the copy inhibition information nor the condition information is contained in the received PDL data, the machine prints out only the document image generated from the PDL data.

Figure 2:
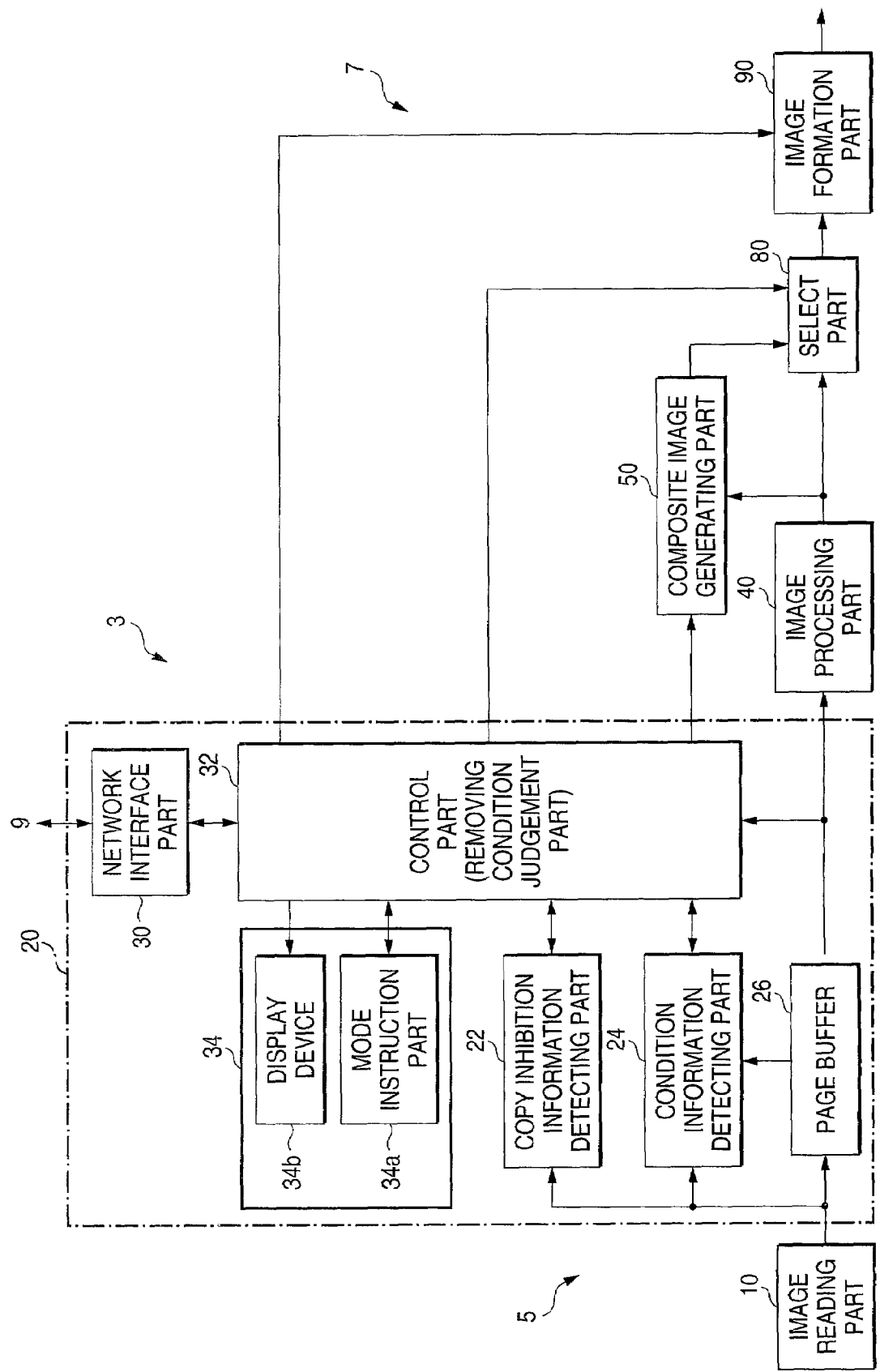
FIG. 2 is a block diagram showing a configuration of an embodiment of the complex machine.

FIG. 2 is a block diagram showing a configuration of an embodiment of the complex machine 3. The complex machine 3 is an apparatus of the type which outputs a visible image by recording an image on a predetermined recording medium by utilizing xerography technique. The complex machine 3 includes the scanner part 5 for reading an image and the printer part 7 which prints out the image.

The scanner part 5 includes an image reading part 10 for reading a document image, and an operation control part 20 which receives an instruction from a user, and has a function of controlling the reading operation, printing out operation and the like. The printer part 7 includes the operation control part 20 used in common with the scanner part 5, an image processing part 40 which executes desired image processes on the image read by the image reading part 10, a composite image generating part 50 which generates a composite image, a select part (selector) 80 which selects and outputs an image from the image processing part 40 or the composite image generating part 50, and an image formation part 90 of the raster scan type which outputs the image on a recording sheet.

The operation control part 20 includes a copy inhibition information detecting part 22 which detects copy inhibition information from the image read by the image reading part 10, a condition information detecting part 24 which detects condition information from the image read by the image reading part 10, and a page buffer 26 as an example of a storage part which stores the image read by the image reading part 10.

The operation control part 20 includes a network I/F (interface) part 30 which receives PDL data from the client terminal 2 via the network 9 and has a communication function of communicating with other network connection devices, a control part 32 which controls the whole complex machine, and a control panel 34 having functions of displaying information to a user and receiving a keyboard input. The control panel 34 includes a mode instruction part 34*a* which receives an operation mode of the complex machine 3 or other various settings or configuration by using an input device such as numeric keys or a touch panel (not shown), and a display device 34*b* such as an LCD (liquid crystal) panel.

The control part 32 has two functions: serving as a controller in accordance with the invention, and serving as a removing condition judgement part for determining whether a condition, presented in the condition information and detected by the condition information detecting part 24, satisfies a precondition, which is defined in advance, for removing the copying inhibition. A "removing condition judgement part" inside the control part 32 in FIG. 2 designates the second function.

In the complex machine 3, two kinds of copying operation modes, a "normal copy mode" and a "condition copy mode", can be set, and the complex machine 3 is designed to differently operate depending on the copying operation mode as set. This mode selection is realized in a manner that the mode instruction part 34*a* of the control panel 34 transmits the user's instruction as received to the control part 32, and the control part 32 controls the copy inhibition information detecting part 22, the condition information detecting part 24 or the composite image generating part 50. For example, the copy inhibition information detecting part 22 is configured such that it operates only when the "normal copy mode" is selected and does not operate when the "condition copy mode" is selected. The condition information detecting part 24 is configured such that it operates only when the "condition copy mode" is selected, and does not operate when the "normal copy mode" is selected.

The image reading part 10 reads a document placed on a platen glass (not shown) by a reading optical system, executes an image pickup signal processing such as a gain control, color separation or a white balance processing on the document image as read, inputs image data of R, G and B representing the processed image to the copy inhibition information detecting part 22 and the condition information detecting part 24, and stores the processed data to the page buffer 26.

When receiving a request, the page buffer 26 outputs the stored image to the condition information detecting part 24, the control part 32 and the image processing part 40. The image processing part 40 reads out the document image from the page buffer 26, executes image processes such as a base removing process and an emphasis process by using a spatial filter, and inputs the processed image to the image formation part 90 through the composite image generating part 50 or the select part 80.

The composite image generating part 50 decomposes the PDL data received from the control part 32 to thereby generate a document image. The composite image generating part 50 generates a background image containing a pattern image which corresponds to the copy inhibition information or a copy-condition pattern image which corresponds to the condition information, under control of the control part 32. Then, the composite image generating part composes the background image and the document image which is previously decomposed or the read image received from the image processing part 40.

The image formation part 90 generates a binarized signal used for each printing color on the basis of the image which is selected by and output from the select part 80 or the image output from the control part 32. For example, the image formation part converts the image data of the RGB color system to image data of the YcrCb color system, and maps the converted data of the YCrCb color system to the data of a color system of at least three (preferably, four) color components, e.g., the CMY color system or the CMYK color system, whereby raster data (binarized data) color separated for printing out is generated. During the process of rasterizing the data, the following operations are performed: under color removal (UCR) for removing C, M, Y components of a color image or gray component replacement (GCR) for partially replacing the subtracted CMY component with the K component.

Further, the image formation part 90 linearizes the color separation in order to adjust the toner image of the output image formed responsive to the output data (e.g., CMYK), or a executes a similar process. The image formation part 90 modulates and drives a light source (not shown) in accordance with the generated binarized signal, and scans a photo-receptor drum (not shown) by a modulated light from the light source, thereby forming an electrostatic latent image on the drum. Further, the latent image is transferred to the recording sheet, and a print output is produced.

Figure 3:
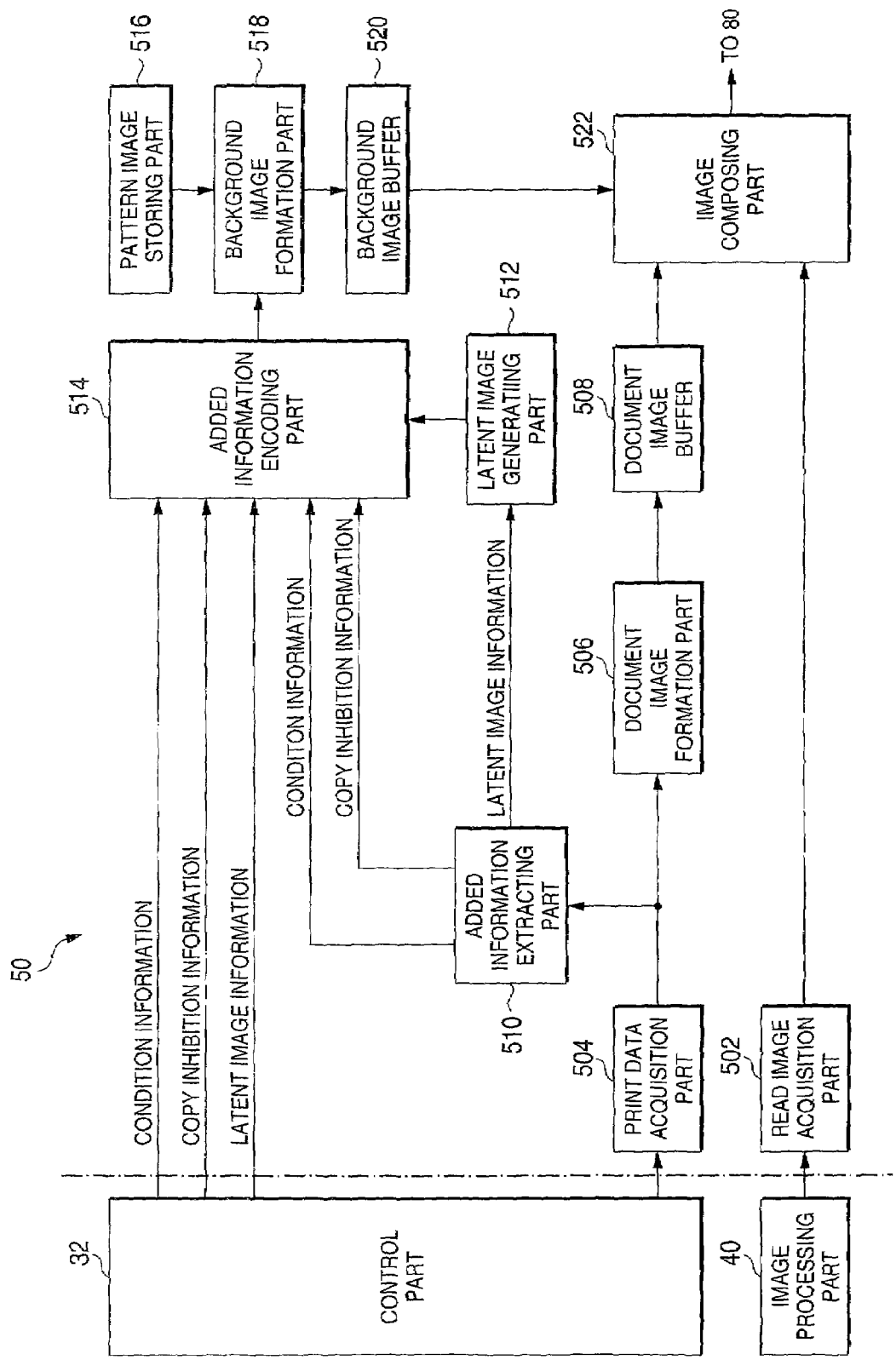
FIG. 3 is a block diagram showing a configuration of an embodiment of the composite image generating part contained in the complex machine.

FIG. 3 is a block diagram showing a configuration of an embodiment of the composite image generating part 50 contained in the complex machine 3. The composite image generating part 50 includes a read image acquisition part 502 which acquires a read image (scanned image) through the image processing part 40, a print data acquisition part 504 which acquires the PDL data through the control part 32, a document image formation part 506 which analyzes (decomposes) the PDL data acquired by the print data acquisition part 504 and generates a document image, and a document image buffer 508 as an example of a storage part which stores the document image generated by the document image formation part 506.

The composite image generating part 50 also includes an added information extracting part 510 which extracts added information, such as the copy inhibition information, condition information or the latent image information, from the PDL data that the print data acquisition part 504 acquired, a latent image generating part 512 which generates a latent image on the basis of the latent image information extracted by the added information extracting part 510, an added information encoding part 514 which generates code data by encoding the copy inhibition information and the condition information which are extracted by the added information extracting part 510, and a pattern image storing part 516 which stores a pattern image expressed by a plural kinds of dot patterns corresponding to the code data encoded from the copy inhibition information and the condition information. The pattern image will be described later in detail.

The latent image generating part 512 reads the latent image character strings represented by the latent image information, and raster develops the latent image character strings as read by using a given font or fonts, to thereby generate a latent image character image as a binarized image. The added information encoding part 514 error correction encodes the coded data of the condition information as input from the added information extracting part 4, and converts the coded data of the copy inhibition information and the coded data of the condition information, which is error correction encoded, into predetermined code data, while referring to the latent image character image data as input from the latent image generating part 512. In this way, the added information encoding part 514 generates a two-dimensional array of the code data corresponding to one image.

The font used for generating the latent image character image has preferably a relatively large point type (e.g., 48 point type) in order to cause the latent image character image to exhibit the effect similar to that of the anticopy/counterfeit sheet. The latent image character image is preferably binarized so as to satisfy the following 1) and 2) equations:

$$\text{resolution of the latent image character image} = \text{printer resolution} \div \text{number of width pixels of a pattern} \quad 1)$$

$$\text{number of height/width pixels of the latent image character image} = \text{number of height/width pixels of a document image} \div \text{number of width pixels of a pattern.} \quad 2)$$

In an example where the printer resolution=600 dpi; the number of width pixels of the pattern is 12 pixels, and the number of pixels of the height (sub-scan direction) of the document image data×the number of pixels of the width (main scan direction)=4960×7015 pixels, the resolution of the latent image character image is 50 dpi, and the number of height pixels×number of width pixels=413×584 pixels. Specifically, one pixel (one black pixel) of the latent image character image is selected to be substantially equal in size to one pattern image. By so selected, black pixels of the latent image may be arrayed in the size units of the pattern image corresponding to the copy inhibition information and condition information. Accordingly, when embedding the latent image character in the background image, each black pixel of the latent image character is embedded in a size unit or an array unit of the pattern image.

The added information encoding part 514 is designed to generate code data by encoding the copy inhibition information, condition information and the latent image information as input not only from the added information extracting part 510, but also through the control part 32. The reason for this is to realize the composition of the read image read by the image reading part 10 and the background image. When generating code data, the added information encoding part 514 converts the code data of the latent image generating part according to predetermined rules, while referring to the latent image, which is generated by the latent image generating part 512.

The composite image generating part 50 further includes a background image formation part 518, a background image buffer 520 and an image composing part 522. The background image formation part 518 generates a background image on the basis of the code data (added information) encoded by the added information encoding part 514 and the pattern image stored in the pattern image storing part 516. The background image buffer 520 is an example of the storage part which stores the background image generated by the background image formation part 518. The image composing part 522 reads the document image from the document image buffer 508, reads the background image from the background image buffer 520, and superimposes the read images one on the other to thereby generate a composite image.

The background image formation part 518 generates a background image in which a copy inhibiting pattern image area and a condition pattern image area are repeatedly, two-dimensionally arranged according to the predetermined rules, while referring to a code array generated by the added information encoding part 514 and the pattern images corresponding to each of code data stored in the pattern image storing part 516.

Figure 4:
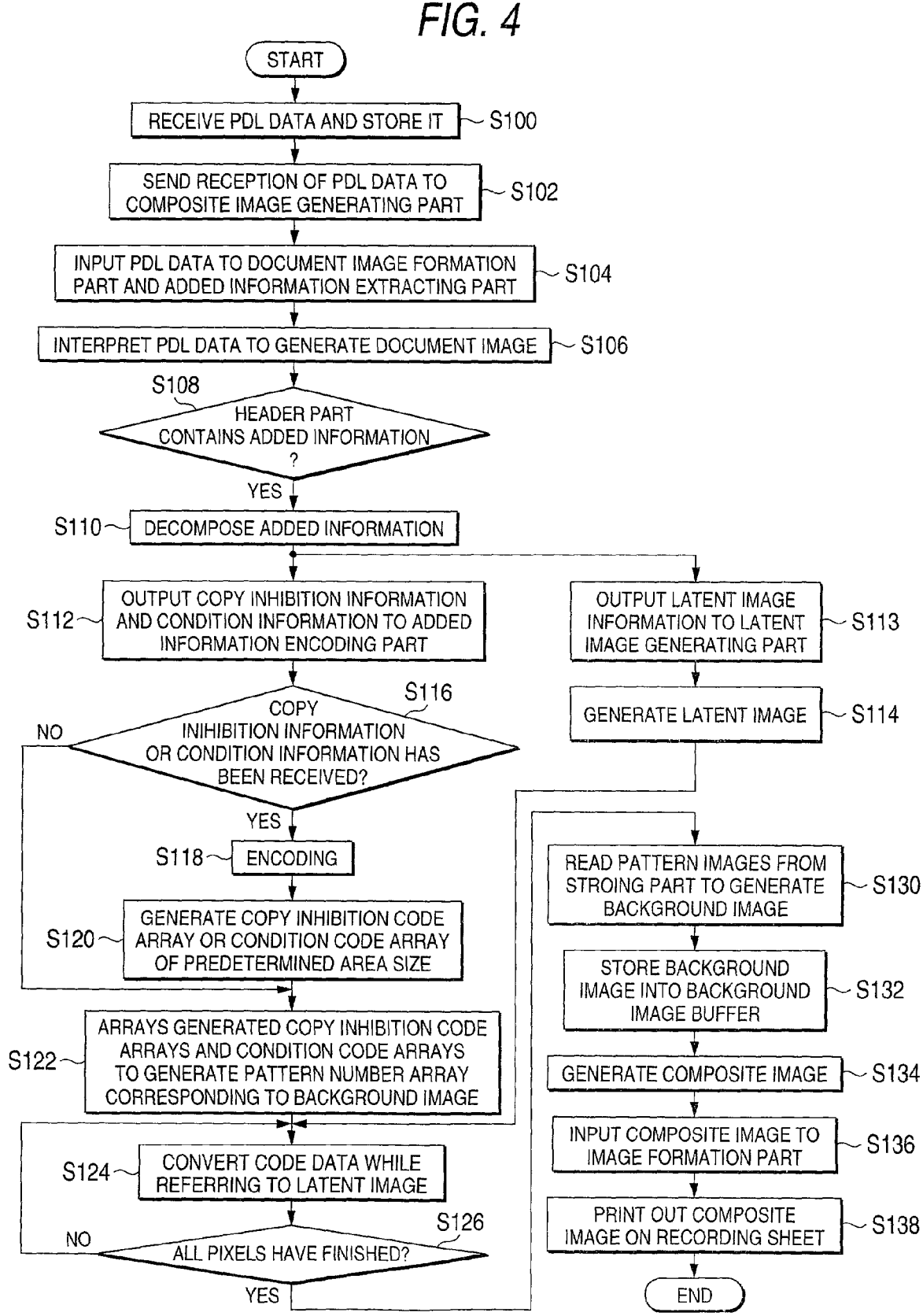
FIG. 4 is a flow chart exemplarily showing a processing procedure of a process of the composite image generating part, particularly a background image generating process and an image composing process.

FIG. 4 is a flow chart exemplarily showing a processing procedure of a process of the composite image generating part 50, particularly a background image generating process and an image composing process. In the description to follow, a composite image is printed out based on the PDL data transmitted from the client terminal 2 (background image generating process at the time of printing).

The control part 32 receives the PDL data through the network I/F part 30 and temporarily stores it in an internal memory (not shown) (step S100). The control part 32 sends the reception of PDL data to the composite image generating part 50 (step S102).

The print data acquisition part 504 of the composite image generating part 50 receives the PDL data from the internal memory of the control part 32. And it inputs the received PDL data to the document image formation part 506 and the added information extracting part 510 (step S104). The document image formation part 506 interprets the PDL data to generate a document image, and outputs it to and stores it in the document image buffer 508 (step S106). A resolution of the document image generated is equal to a printer resolution.

The added information extracting part 510 checks if added information is added to the header part of the PDL data (step S108). If the added information is added, it extracts the added information (step S108: YES), and decomposes it into copy inhibition information, condition information or latent image information (step S110). And the added information extracting part 510 outputs the copy inhibition information and the condition information to the added information encoding part 514 (step S112), and outputs the latent image information to the latent image generating part 512 (step S113). Here, the latent image information is information indicating what kind of latent image characters are embedded into the pattern image. Specific examples of the information are character strings of the latent image, font type and size, and direction (angle) of the latent image character string.

The latent image generating part 512 generates a latent image based on the latent image information received from the added information extracting part 510 (step S114). A latent image character string is depicted at the designated font type and size and in the designated direction, to thereby generate a binary latent image. The latent image generating part 512 inputs the generated latent image to the added information encoding part 514. A resolution of the latent image is equal to a resolution which is the product of dividing the printer resolution by the size of a pattern image to be given later. In an example that the printer resolution is 600 dpi (dot/inch) and the size of the pattern image is 12 pixels×12 pixels, the resolution of the latent image is 50 dpi.

The added information encoding part 514 checks if the copy inhibition information and the condition information have been received (step S116). If those pieces of information have been received, the copy inhibition information and the condition information are encoded (step S116: YES, S118). If the copy inhibition information has not been received or the information is not for inhibiting a copying machine from copying the document of which the printing out is instructed, the added information encoding part does not generate the copy inhibition code array and proceeds to the next process (step S116: NO).

When receiving copy inhibition information, the added information coding part 514 encodes the copy inhibition information to generate a copy inhibition code array of a predetermined area size (step S120). When receiving the condition information, the added information encoding part 514 error correction encodes the condition information to generate a condition code array of a predetermined area size (step S120). Elements constituting the code array are each code data "0" or "1".

A data train is generated so as to be able to express the condition information by utilizing plural kinds of code data. The data train (condition code=coded condition information) is error correction encoded. The error correction data train is arranged into a two-dimensional array (unit two-dimensional array) of given size. At this time, the data array on the outermost periphery or the like of the unit two-dimensional array is defined in advance so as to make the positioning of the condition code array easy and so as not to cause a decoding error when a detecting process and a judging process (decoding of the code) are carried out in the image reader (the detail of this will be described later).

Subsequently, the added information encoding part 514 repeatedly arrays a plurality of generated copy inhibition code arrays and a plurality of condition code arrays according to a predetermined rule. In this case, it arrays them preferably two-dimensionally, to thereby generate a pattern number array having the same size as of the whole latent image, viz., to generate a pattern number array corresponding to the background image (step S122). When the copy inhibition code array (one of the two kinds of copy inhibition code arrays) is not generated (step S118), the condition code array is located at the part of the copy inhibition code array not generated. When the condition code array is not generated, the copy inhibition code array is located at the part of the condition code array.

In this case, one of the two kinds of copy inhibition code arrays may be utilized or the two kinds of copy inhibition code arrays may be combined appropriately. For example, one kind of code data is arrayed over the entire image. In an alternative, plural kinds of code data are two dimensionally arrayed in an area of predetermined size, to generate a unit two-dimensional array. Further, the unit two-dimensional arrays are linearly arrayed in the vertical or horizontal direction (one dimensionally), preferably the unit two-dimensional arrays are repeatedly arrayed in both the vertical and horizontal directions (two dimensionally), to thereby generate the code arrays of one image. When the condition code array of the unit two-dimensional array is generated, this condition code array is also combined. When the condition code is used for removing the copy inhibition within fixed limits, it is preferable that a number of condition code arrays, not one condition code array, are repeatedly arrayed over the image to ensure the reliable detection.

The added information encoding part 514, while referring to the latent image, converts the code data of the pattern number array elements corresponding to the black pixel in the latent image according to predetermined rules, and this data conversion is performed on all the pixels in the latent image (steps S124, S126). In this case, the black pixels of the latent image are embedded in the size units of the pattern image. As a result, the pattern number array is such that latent image characters are depicted by the pattern number (e.g., "2") according to the predetermined rules on the background in which the copy inhibition codes and condition codes are arrayed. The added information encoding part 514 inputs the pattern number array to the background image formation part 518 (step S126).

The background image formation part 518 refers to each element of the pattern number array received from the added information encoding part 514, and reads out a pattern image corresponding to the pattern number from the pattern image storing part 516, and generates a background image consisting of an aggregation of pattern image arrays (step S130). Then, the background image formation part 518 stores the generated background image into the background image buffer 520 (step 132).

Finally, the image composing part 522 reads the document image from the document image buffer 508, and at the same time reads out the document image from the background image buffer 520, and composes the pixel data of those images, and generates a whole composite image (step S134). The image composing part 522 inputs the generated composite image to the image formation part 90 through the select part 80 (step S136). The image formation part 90 prints out the composite image as input on the recording sheet (step S138). Since the background image has already composed by the image composing part 522, the image formation part 90 prints out the composite image of the original document image and the background image.

FIGS. 5(A) to 5(F) exemplarily show the code data which may be detected when the copying operation is performed by using a predetermined machine, and pattern data made to correspond to the code data. The copy inhibition information, condition information or latent image information as one of the added information is assigned to the code data.

For example, when the copy inhibition information inhibits a copying machine from copying the document instructed to be printed out, the added information encoding part generates one of the two kinds of copy inhibition code arrays shown in FIGS. 5(A) and 5(B) (see step S120). The copy inhibition code array of FIG. 5(A) is such that the code data (pattern numbers) in the array are all "0s", and the copy inhibition code array of FIG. 5(B) is such that the code data in the array are all "1s". When the copy inhibition information is not input, or when the copy inhibition information is not the information for inhibiting a copying machine from copying the document instructed to be printed out, the added information encoding part 514 does not generate the two kinds of copy inhibition code array shown in FIGS. 5(A) and 5(B).

In the illustrated instance, the size of the unit two-dimensional array is defined by 20 (vertical or sub-scan direction)× 20 (horizontal or main scan direction). The area size is preferably about ¼ or smaller of the entire image in the vertical and horizontal directions. Such an area size is not apply only to this instance. Where the area size is too small, some disadvantage may arise, however. A preferable area size is such that 100 number of "0s" or "1s" are contained in one area size. In all cases, such an area size as to allow the unit two-dimensional arrays to be repeatedly arrayed in the whole image, is preferable.

When the condition information is inputted, the added information encoding part 514 applies an error-correction encoding process to the condition information to generate the condition code array as shown in FIG. 5(C). When the condition code array is not generated, the copy inhibition code array is generated in place of the condition code array. The code array of FIG. 5(C) represents the encoded condition information in the form of a two-dimensional array (two-dimensional code) consisting of "0s" and "1s" of code data. The size (area size) of the unit two-dimensional array of the condition code array, as of the copy inhibition code array, is also defined by 20 (vertical or sub-scan direction)×20 (horizontal or main scan direction).

Synchronizing codes are allotted to the periphery of the condition code array by employing a special data array to make it easy to position the array (see FIGS. 17(A) and 17(B) described later). In the illustrated instance, the periphery of the rectangular area having given vertical and horizontal sizes is entirely defined by "1s". In encoding the condition information, a two dimensional code is generated within an area enclosed by the synchronizing code in a manner that bit trains are arranged into a two-dimensional array according to given rules, while correcting the bit trains corresponding to the condition information.

In this case, to distinguish the two-dimensional code from the synchronizing code, the number of successive "0s" or "1s" is smaller than the number of data trains in the area side of a portion except the synchronizing code. In the case of the area size of 20 (vertical)×20 (horizontal), the number of the numerals successively arrayed in the vertical or horizontal direction is selected to be 17 or smaller. To decode the condition code thus constructed, the synchronizing codes expressed in a special data array are referred to and the code data contained therein is developed into data trains (bit trains) according to predetermined rules, whereby the condition information is detected.

In the step S122, the copy inhibition code arrays and the condition codes are repeated according to predetermined rules to generate a pattern number array having the same size as of the whole latent image. As a result, the values of the elements of the pattern number array are "0s" or "1s", on the whole image.

FIGS. 5(D), 5(E), and 5(F) show examples of pattern images stored in the pattern image storing part 516. The pattern image is expressed in a matrix having a size of 12 pixels×12 pixels. FIG. 5(D) shows a pattern image corresponding to code data (pattern number) "0", which is an oblique line pattern consisting of black dots, slanted downward from the start point side of the scanning lines. FIG. 5(E) shows a pattern image corresponding to code data (pattern number) "1", which is an oblique line pattern consisting of black dots, slanted downward to the start point side of the scanning lines. Those two kinds of oblique line pattern images are presented as examples of first and second image patterns of the invention.

In each of those two kinds of pattern images representing the copy inhibition codes, a feature of a pattern consisting of black dots is expressed by a linear function. Means to express the pattern feature may be used if it presents easy processing when the detection process and the judging process are carried out in the image reader. A quadratic function or a combination of the linear function and the quadratic function may be used for expressing the pattern feature, as in another embodiment to be described later.

FIG. 5(F) shows a pattern image corresponding to the code data (pattern number) "2", which is an example of a pattern image produced after the coordinates of the black pixels in the latent image are converted in the step S124. In this instance, the pattern image is a dot pattern image in which black pixels are scattered over the pattern image. Those pixels are positioned at scattered points of coordinates (3, 3), (1, 6), and others (for the detail of the pixels coordinates, reference is made to the figure).

On the whole background image expressed by the pattern image, the oblique line patterns (FIGS. 5(D) and 5(E)), which depend on the data values of the copy inhibition code array (FIGS. 5(A) and 5(B)) and the condition code array (FIG. 5(C)) are converted into patterns which are two-dimensionally arrayed while being repeated at given cycles according to predetermined rules. The latent image character part is converted into an isolated dot pattern (FIG. 5(F)).

A resolution of the pattern number array corresponds to a resolution which is the product of dividing the printer resolution by the pattern size. A pattern image generated based on the resolution is generated in such a manner that one element of the pattern number array is replaced with one pattern. Therefore, a resolution of the generated pattern image is equal to that of the printer.

The black pixels of the pattern images "0", "1" and "2" are arrayed in different forms. The numbers of the black pixels (7 and 8 pixels) of the pattern images are substantially equal to one other. Optical densities of those pattern images are substantially equal on the printed out recording medium irrespective of the array forms of the black pixels. The pattern image "2" which is disposed at a position of the black pixel of the latent image character is a pattern image in which isolated dots are dispersively positioned as shown in FIG. 5(F). Accordingly, when the pattern image is copied, the isolated dots are hard to be reproduced. Some printing characteristic of the printer often makes the density of the printed image somewhat different depending on the array form of black pixels even if the numbers of black pixels are substantially equal. In this respect, it is preferable that the number and the array form of black pixels forming each pattern image are selected so that the densities of the printed out image data are exactly equal to each other.

FIGS. 6(A) to 6(C) are diagrams showing an example of a background image, which is generated by combining and arranging pattern images as mentioned above, and printed out. FIG. 6(A) is a diagram showing an overall background image expressed by pattern images. The image data represents a binary image of 1 bit/pixel. In the figure, characters "COPY" are latent image characters. Actually, those characters are not legible, while clearly seen in the figure, since the characters are designed to have a density substantially equal to that of the background. Those characters are legibly depicted for ease of explanation.

A part (area enclosed by a rectangular) of the latent image character is enlarged and illustrated in FIG. 6(C). As seen from the figure, the inside of the latent image character is formed with a dot pattern image containing small dots arrayed randomly and densely. The background image outside of the latent image characters is formed with two kinds of oblique line patterns shown in FIGS. 5(D) and 5(E). A two-dimensional code may be constructed by making data "0" and "1" assigned to the two kinds of oblique line patterns. The pattern images inside and outside the latent image characters are different from those outside the latent image. An average density (black pixel area per unit area) inside the latent image on the printed out background image is substantially equal to that outside the latent image. The printed out background image is seen as if it is a uniform gray background.

When the background image shown in FIG. 6(A) is printed out, and the resultant image is copied by a copying machine, the relatively large dots outside the latent image are faithfully reproduced, but relatively small dots within the latent image characters cannot be faithfully copied by the copying machine. As a result, only the part (background part) outside the latent image characters is reproduced, and the latent image character part is voided white, whereby an image as shown in FIG. 6(B) is reproduced. An image that is actually printed out on the sheet is an image formed by incorporating a document image on the FIG. 6(A) background image containing a number of pattern images according to given rules. In this instance, the character image is snow white not containing characters and graphics, for ease of explanation.

The black pixels of the latent image characters are embedded in units of the pattern image size. The pattern image corresponding to the copy inhibition information and condition information is connected to the pattern image corresponding to the latent image characters in a lattice fashion. The process which generates the background image while referring to the code data of the pattern image may also be executed every pattern image size unit. Accordingly, the background image is generated at high speed.

Figure 7:
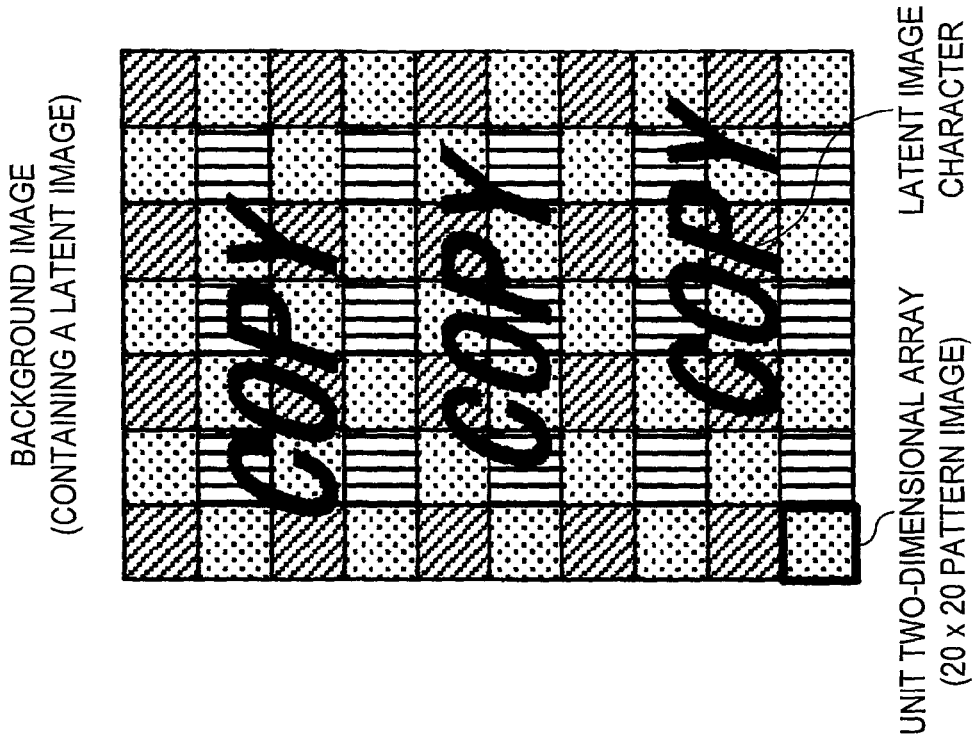
FIGS. 7(A) and 7(B) are diagrams showing another example of the background image generated from the composite image generating part.
Figure 7:
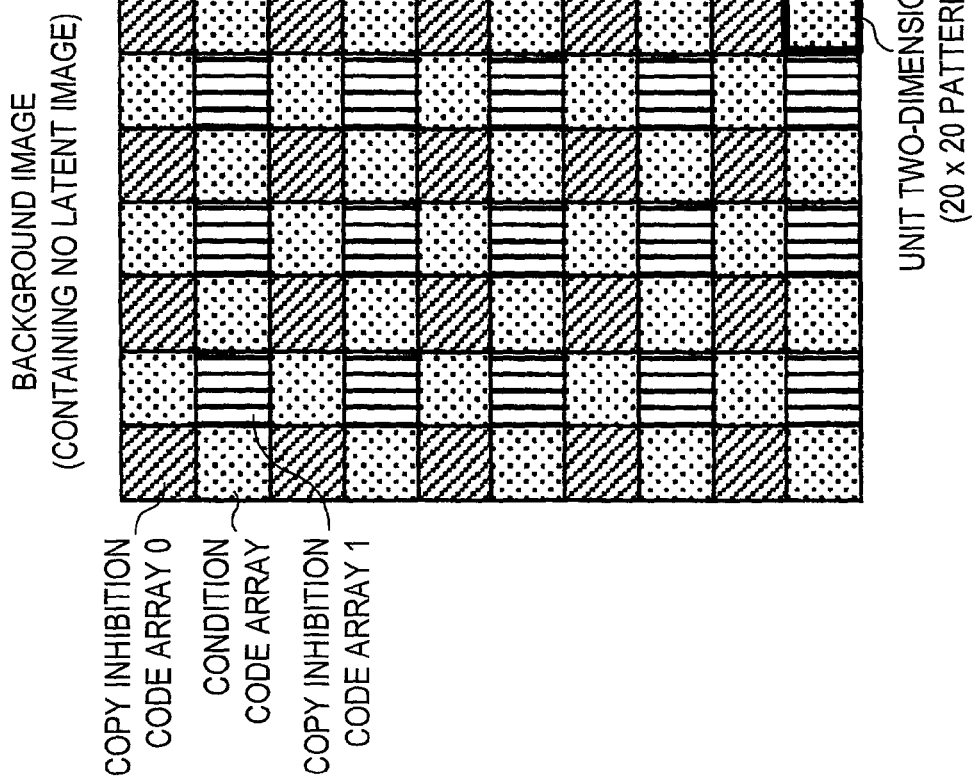

FIGS. 7(A) and 7(B) are diagrams showing another example of the background image generated in the step S130. Also in this example, the latent image characters "COPY" shown in FIG. 6 may be depicted. A square hatched by oblique lines is the copy inhibition code array (code data "0") of FIG. 5(A); a square hatched by vertical lines is the copy inhibition code array (code data "1") of FIG. 5(B); and a square hatched by dots is the condition code array (code data "0" or "1") of FIG. 5(C).

As already stated (see step S122), when the copy inhibition codes are not generated, the condition codes are located at the parts of the copy inhibition codes. If the condition code is not generated, the copy inhibition code is located at the parts of the condition codes in the figure. Accordingly, at this time point, the values of the elements of the pattern number array are "0" or "1". In FIG. 7(A), this state is shown by corresponding hatching squares, and corresponds to the unit two-dimensional arrays shown in FIGS. 5(D) to 5(F).

Here, the image areas of the unit two-dimensional arrays corresponding to the two kinds of copy inhibition code arrays are examples of first and second pattern image areas. An image area of the unit two-dimensional array corresponding to the condition code array is an example of the copy condition image area. An image area of the latent image character part is a third pattern image area.

FIG. 7(B) shows the result of changing to "2" the pattern number of the elements constituting the pattern number array corresponding to the coordinates of the black pixels of the latent image characters "COPY" by the added information encoding part 514. The pattern number array is such that the pattern number "2" corresponding to the latent image character is depicted in a state that the copy inhibition code and the condition code are superimposed on the pattern arrays of the background image, which are repeatedly arranged at cycles according to predetermined rules.

As seen from the foregoing, the code data "0", "1", "2" correspond to the pattern images of FIGS. 5(D) to 5(F), and those are two-dimensionally arrayed to form the copy inhibition code array and the condition code array. The code data are repeatedly arrayed at predetermined cycles into a two-dimensional array. Accordingly, for the corresponding background image, one or several kinds of pattern images are arranged so as to detect the control information (i.e., the code data already stated) for controlling the copying operation.

In the previous instance, the background image is generated such that the pattern images cover the entire original image. The background image and the original image are composed. In this case, it is not essential to arrange the pattern images so as to cover the entire original image. In order to prevent an easy deletion of the copy inhibition information, in a case where an original image contains an important part in which information to be transmitted to the user is described, e.g., a text object, the background image is generated in a state that the pattern image is located overlapping with at least a part of the text part. In an alternative, the pattern image may be located overlapping with the graphics object as well as the text object. In other words, if the original image contains an essential object to be transmitted to the user, it suffices to generate the background image so that the pattern image overlaps with at least a part of the essential object. Such a superimposing fashion will readily be understood without the aid of graphical illustration, and hence its graphical illustration is omitted.

If the array size of the copy inhibition code array and the condition code array are designed to have a predetermined array size (this size will also be referred to an area size of the control code array), and those are repeatedly arrayed at given cycles (preferably into a two-dimensional form) in given size units, plural kinds of pattern images are arrayed on the corresponding background image so as to detect the control information (i.e., the code arrays and their combination).

As described above, where a process of generating a composite image by the composite image generating part 50 is used, when a printed out document image is copied by a copying machine, an image of characters or the like having been embedded as a latent image comes forth into view. Accordingly, psychological deterrent acts on the illicit copying act, and one can distinguish between the original and the copied sheet by the emerging image. The original image of an original document is superimposed on the background image. If the presence of the pattern image is clearly seen, it is impossible to remove (hide, paint out, cut out) the pattern image. When the copy inhibition code is made to correspond to the pattern image, the illicit copying can completely be prevented.

Plurality kinds of pattern images, which represent the copy inhibition codes, are expressed by the quadratic function or simpler function (in the previous instance, two kinds of oblique lines as exemplarily expressed by the linear function). Accordingly, the execution of the detecting process and the judging process in the image reader is simple. In other words, the process of detecting the copy inhibition codes and the process of judging the same are carried out concurrently with the image reading process in a real time manner. Accordingly, at least for the control to completely inhibit the copying operation, there is no need of imparting the high level copy control operation to the user.

When the condition code is thus constructed by utilizing the plural kinds of pattern images, the condition code for removing the copy inhibition may be embedded into the confidential document. The image reader can detect the condition code relatively simply or reliably. Such high level copying operation controls as to permit a specific user to copy for each document, and to permit the user to copy the document after the predetermined date and time are past, may be automated, and hence gives no trouble to the user. In a case where a number of the condition codes are repeatedly arranged over the entire image surface, even if the latent image is embedded or it and the original image are composed, and the condition code is partially lost, the embedded removing condition can be decoded with high precision.

Next, utilization of the composite image thus generated, particularly a method of controlling the copying operation in the copying machine, will be described. Here, "to control the copying operation" involves "to inhibit the copying operation", and "to permit the copying operation within fixed limits".

Figure 8:
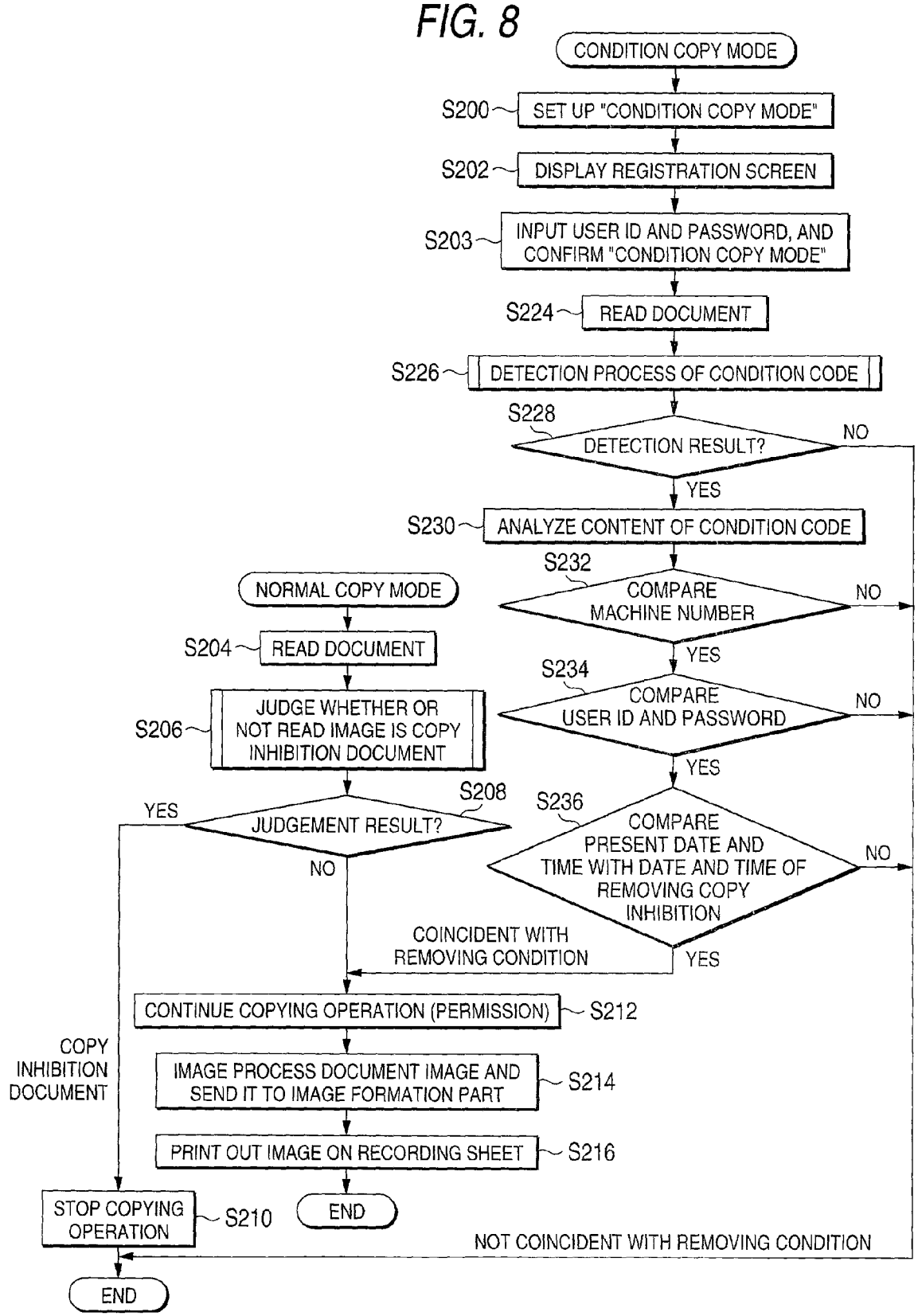
FIG. 8 is a flow chart exemplarily showing processing procedures of copying a document.

FIG. 8 is a flow chart exemplarily showing processing procedures of copying a document, which is printed out according to the procedures shown in FIG. 4, in the "normal copy mode" or the "condition copy mode". A processing procedure of the "normal copy mode" will first be described.

The complex machine 3 is normally set to the "normal copy mode". Accordingly, usually, there is no need to change the operation mode, particularly. If the "condition copy mode" has been selected, a user operates the control panel 34 of the complex machine 3 to set up the "normal copy mode". Responding to this, the control part 32 causes the copy inhibiting information detecting part 22 to operate, and causes the condition information detecting part 24 not to operate.

To start, the image reading part 10 reads the document placed on the platen, stores the document image as read into the page buffer 26, and inputs it to the copy inhibiting information detecting part 22 and the condition information detecting part 24 (step S204).

The copy inhibiting information detecting part 22 operates only when the "normal copy mode" is selected. The copy inhibiting information detecting part 22 checks if a pattern image corresponding to the copy inhibition code is contained in the document image read by the image reading part 10, viz., executes a detection process of the copy inhibition code to thereby judge whether or not the image to be processed is a copy inhibition document (details of this will be described later), and inputs the judgment result to the control part 32 (step S206). A process in the copy inhibiting information detecting part 22 is executed in synchronism with the image signal as input from the image reading part 10, in real time manner.

The control part 32 controls the output operation on the basis of the judgement result as input from the copy inhibiting information detecting part 22 (step S208). For example, when the judgement result as input from the copy inhibiting information detecting part 22, indicates that the read document is the copy inhibition document (the copy inhibition code is detected), the control part stops the copying operation (S208: YES, S210). When the judgment result indicates that the document is not the copy inhibition document (the copy inhibition code is not detected), the control part 32 controls the select part 80 to permit the image from the image processing part 40 to go to the image formation part 90, and causes the machine to continue the copying operation in the following manner (S208: NO, S212).

The image processing part 40 reads the document image stored in the page buffer 26, executes image processes on the read document image, such as a base removing process, emphasis process by a spatial filter, color converting process and a tone correction process, and inputs the processed image to the image formation part 90 through the select part 80 (S214). The image formation part 90, as usual, prints out the image as input from the image processing part 40 side on the recording sheet (S216).

As described above, in the "normal copy mode", when the pattern image representing the copy inhibition code is contained in the document image read by the image reading part 10, the copy inhibiting information detecting part 22 detects the copy inhibition code, to thereby inhibiting the copying operation. When the pattern image representing the copy inhibition code is not contained in the document image, the read image may be printed out on the recording sheet, and hence, the normal copying operation is allowed.

A processing procedure of the "condition copy mode" will be described. To start, a user operates the control panel 34 of the complex machine 3 to set up the "condition copy mode" (step S200). Responding to this, the control part 32 displays on the control panel 34 a registration screen from which a user ID and a password are entered (S202). The user enters his user ID and password on this screen. As a result, that the "condition copy mode" has been set up, and the user ID and the password are send to the control part 32. The control part 32 configures the system so as to prohibit the copy inhibiting information detecting part 22 from operating, but to allow the condition information detecting part 24 to operate (step S203).

Then, the image reading part 10 reads the document placed on the platen glass, stores the read document image into the page buffer 26, and inputs it to the copy inhibiting information detecting part 22 and the condition information detecting part 24 (step S224). The condition information detecting part 24 operates only when the machine is in the "condition copy mode". The condition information detecting part 24 checks if a pattern image corresponding to the condition code is contained in the document image read by the image reading part 10, viz., it detects the condition code, and inputs the detection result to the control part 32 (S226). The condition information detecting part 24 executes in synchronism with the image signal and in real time the following processes: binarizing process, noise reduction process, pattern detection process, and the process of storing of the pattern detection result to the buffer memory (The details of the process execution will be described later).

The control part 32 judges the detection result as input from the condition information detecting part 24 (step S228). When the judgement result indicates that no condition code is detected, the control part 32 stops the copying operation (S228: NO, S210).

When the judgement result indicates that the condition code is detected (S228: YES), the control part 32 analyzes the content of the condition code, and specifies the condition information corresponding to the condition code detected (step S230). The condition code is a code corresponding to the condition information which permits the user to copy the document instructed to be printed out within fixed limits. Examples of the condition code are a password, user ID number (employee number) of the user who is permitted to copy the document, date and time at which the copy inhibition is removed, and machine numbers of copying machines which are permitted to copy.

The control part 32 compares the machine number represented by the condition code with the machine number, or registered machine number, stored in the internal ROM (not shown, the same will be applied hereinafter) of the control part 32 (step S232). When the detected machine number is coincident with the registered machine number (S232: YES), the control part compares the user ID and the password as input from the control panel 34 with the user ID and the password (i.e., registered user ID and registered password), both stored in the internal ROM (step S234).

When the input user ID is coincident with the registered user ID, and further when the registered password corresponding to the registered user ID is coincident with the input password (S234: YES), the control part 32 reads the present date and time from an internal timer (not shown), and compares it with the date and time of removing the copy inhibition, which is represented by the condition code (step S236). When the present date and time are past the date and time of removing the copy inhibition (S236: YES), the control part 32 controls the select part 80 to permit the image of from the image processing part 40 to go to the image formation part 90, and causes the machine to continue the copying operation (S236: YES, S212 to S216).

In the verifying steps of the machine number comparison (S232), the user ID and password comparison (S234), or the date and time comparison (S236), if the verifying condition is not satisfied (not coincident/time is not past), the control part stops the copying operation (S232: NO, S234: NO, S236: NO, S210).

As described above, in the "condition copy mode", when a pattern image representing the condition code is contained in the document image read by the image reading part 10, the condition information detecting part 24 detects the condition code, and the copying operation is permitted only when the predetermined condition registered in advance is satisfied. When a pattern image indicating the condition code is not contained, the read image may be printed out on the recording sheet, and hence, the normal copying operation is allowed.

Figure 9:
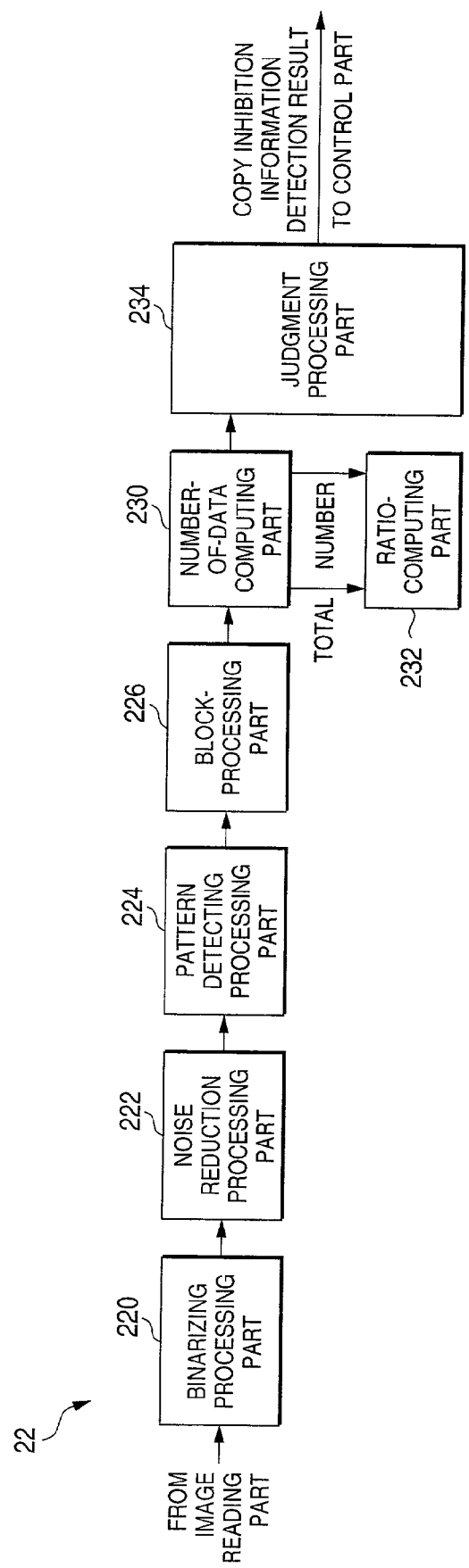
FIG. 9 is a block diagram showing a configuration of a copy inhibiting information detecting part.

FIG. 9 is a block diagram showing a configuration of the copy inhibiting information detecting part 22. As shown, the copy inhibiting information detecting part 22 includes a binarizing processing part 220 for converting (binarizing) input image data into binary data of "0" or "1", a noise reduction processing part 222 for reducing the noise component of the binary image data output from the binarizing processing part 220, and a pattern detecting processing part 224 for detecting a pattern image on the basis of the binary image data of which the noise component is reduced by the noise reduction processing part 222.

The copy inhibiting information detecting part 22 includes a block-processing part 226 for dividing an array pattern of code data as the detection result output from the pattern detecting processing part 224 into small blocks of given size which depends on an area size of a code array (in the previous instance, it is a copy inhibition code array or the like) corresponding to the control information for controlling the copying operation, and a number-of-data computing part 230 for computing the number of array data "0s" and "1s" contained in each small block divided by the block-processing part 226.

The copy inhibiting information detecting part 22 includes a ratio-computing part 232 for computing a ratio of the number of "0s" of the array data computed by the number-of-data computing part 230, and a judgement processing part 234 for judging a block attribute on the basis of the computing result of the number-of-data computing part 230 and the computing result by the ratio-computing part 230. Here, the block attribute indicates that a block to be judged is any of a block representing the copy inhibition code array, a block representing the condition code array, or any of other blocks than those.

Figure 10:
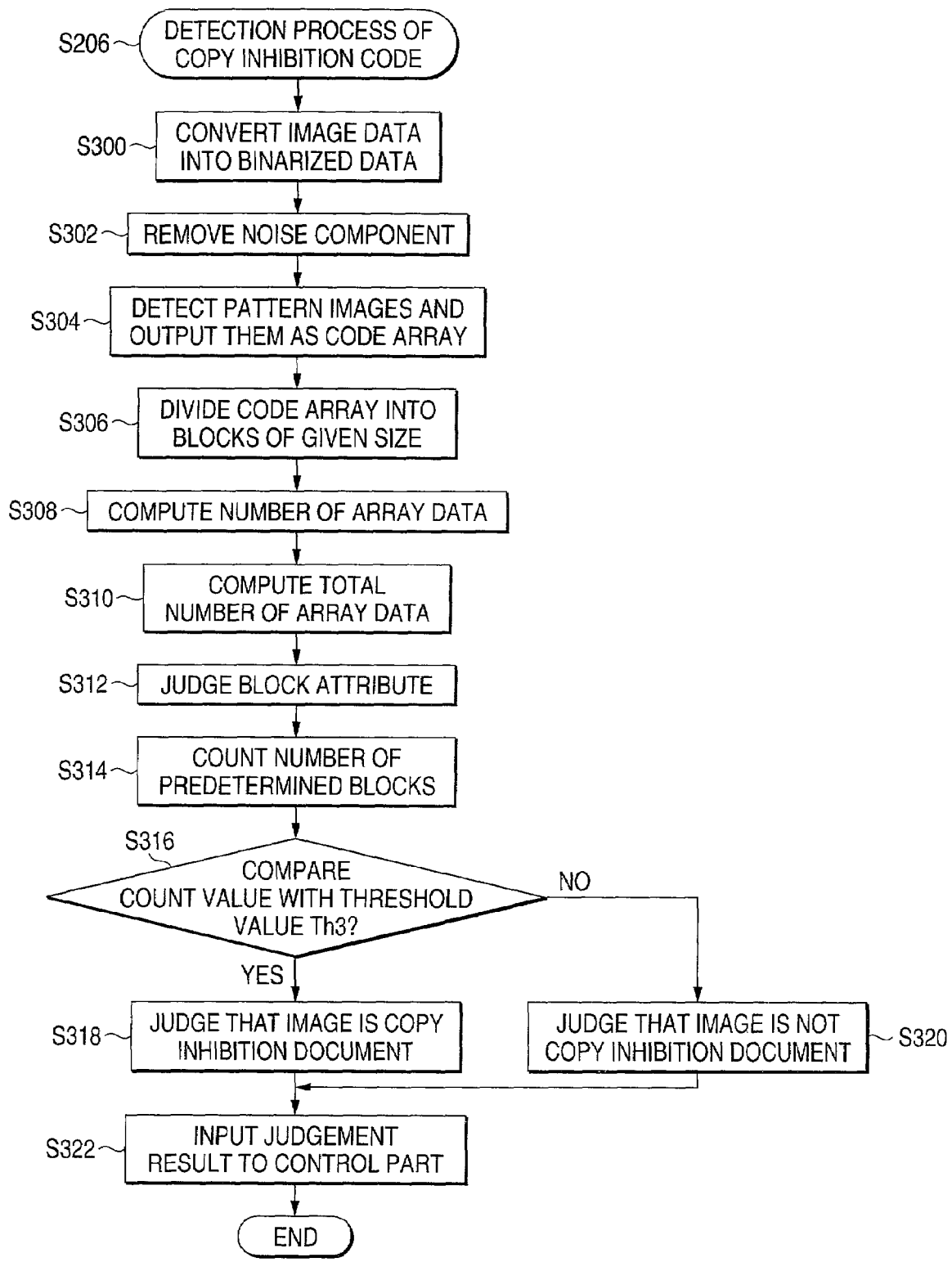
FIG. 10 is a flow chart showing an example of a processing procedure in the copy inhibiting information detecting part.

FIG. 10 is a flow chart showing an example of a processing procedure (corresponding to the step S206 in FIG. 8) in the copy inhibiting information detecting part 22. The binarizing processing part 220 converts the image data output from the image reading part 10 into binarized data of "0" or "1", and inputs the binarized data to the noise reduction processing part 222 (step S300). The noise reduction processing part 222 removes the noise component contained in the binarized data, and inputs the binarized data which contains no noise to the pattern detecting processing part 224 (step S302). The noise reduction processing part 222 gathers clusters of pixels of which the black pixels are connected together, and the pixels of the pixel cluster (the number of coupled pixels) having the size which is not within a predetermined size are replaced with white pixels. The predetermined size is properly selected such that the oblique line patterns are not deleted, but other patterns (isolated dot pattern, and character and graphics in the document) than the oblique line pattern are deleted.

The pattern detecting processing part 224 detects two kinds of oblique line pattern images shown in FIGS. 5(D) and 5(E), and inputs image data of the type in which one pixel consists of two bits to the block-processing part 226 (step S304). The pattern detecting processing part 224 detects the pattern image by the template matching technique in a manner that it successively applies the pattern images (reference patterns) of FIGS. 5(D) and 5(E) to the position of each pixel in an image expressed by the binarized data. The pattern detecting processing part 224 outputs data "0" when it detects the pattern image shown in FIG. 5(D); it outputs data "1" when it detects the pattern image shown in FIG. 5(E); and it outputs data "2" when it does not detect any of pattern images. That is, the image data is made to correspond to the code data, and is output as an code array. The pattern detecting means by using the template matching technique is known, and no further detail of it will be given.

The block-processing part 226 divides a code array expressed in terms of "0", "1" or 2" as the detection result by the pattern detecting processing part 224 into blocks of a given size, and inputs the resultant to the number-of-data computing part 230 (step S306). The block size is selected so that at least one block is contained in each code array in a manner that the block size is smaller than the half of the area size (i.e., area size of the control code array) of the copy inhibition code array and the condition code array.

The number-of-data computing part 230 computes the number of array data "0s" and "1s", which are present in each block set by the block-processing part 226, and inputs the resultant into the ratio-computing part 232 (step S308). The ratio-computing part 232 inputs the total number of the array data "0s" and "1s" to the judgement processing part 234 (step S310). The judgement processing part 234 judges a block attribute on the basis of the total number of array data received from the number-of-data computing part 230 and a ratio from the ratio-computing part 232 (step S312).

When the block to be processed is located within the copy inhibition code array of which the array data are all "0s", and the size corresponds to a given size (area size of the control code array), the oblique line patterns (FIG. 5(D)) corresponding to at least a predetermined number of array data "0s" of are detected in the block. Further, the oblique line patterns (FIG. 5(E)) corresponding to "1" are rarely detected, and a ratio of the oblique line patterns of array data "0" is high, and must be 1.0 or thereabout.

When the block to be processed is located in the condition code array of which the array data are all "1s" an the size corresponds to a given size (area size of the control code array), the oblique lines patterns (FIG. 5(E)) of at least a predetermined number of "1s" are detected. The oblique line patterns corresponding to "0" is rarely detected, and a ratio of the oblique line patterns of array data "0" is low, and must be 0.0 or thereabout.

When the block to be processed contains at least part of the condition code, the oblique line patterns (FIG. 5(D) corresponding to array data "0s" and the oblique line patterns (FIG. 5(E) corresponding to array data "1s" are detected within the block. A ratio of detecting the oblique line patterns of array data "0" is much lower than 1.0, and must be much higher than 0.0.

In the case of the input image data in which the pattern data (any of FIGS. 5(D), 5(E) and 5(F)) representing copy inhibition information is embedded, a plurality of copy inhibition codes of which the array data is "0" and a plurality of copy inhibition codes of which the array data is "1" must be embedded into the block to be processed.

The judgement processing part 234 makes a pre-judgement (first judging process) of the block attribute by utilizing the characteristics mentioned above, in the following manner.

1) When total number>threshold value Th1 and ratio>threshold value Th2, the block to be processed belongs to the copy inhibition code "0s" area.
2) When total number>threshold value Th1 and (1−ratio)>threshold value Th2, the block to be processed belongs to the copy inhibition code "1s" area.
3) When the relations 1) and 2) above are not satisfied, the block to be processed does not belong to the area of the copy inhibition code array.

Here, the through hole Th1 is selected from the block size and the area size of the control code array, while adding a marginal value to the theoretical number of patterns contained in the block. The threshold value Th2 is set at a value near 1.0 (for example, Th2=0.95).

The judgement processing part 234 separately counts the number of blocks of which the copy inhibition code is "0", and the number of blocks of which the copy inhibition code is "1" (step S314). And the judgement processing part compares the count value with the threshold value Th3 (second judging process) (step S316). The threshold value Th3 may be adjusted in accordance with the number of kinds of copy inhibition codes.

When the number of blocks of which the copy inhibition code is "0" is greater than threshold value Th3, and the number of blocks of which the copy inhibition code is "1" is greater than threshold value Th3, the judgement processing part 234 judges that the image is a copy inhibition document (S316: YES, S318). In other cases other the above, it judges that the image is not a copy inhibition document (S316: NO, S320). And it inputs the result of the judgement to the control part 32 (step S322).

This judging method is merely an example; another method may also be employed. The judging method may also be changed in accordance with the number of copy inhibition code types, or the judgement may be made not only by referring to both the number of pattern images and the rate of the pattern images, but also by referring to one of these two.

As described in connection with FIG. 8, when it is the copy inhibition document, the control part 32 stops the copying operation of the machine (S208: YES, S210). When it is not the copy inhibition document, the copying operation is permitted, and therefore the control part causes the machine to continue the copying operation (S208: NO, S212).

In the process of detecting the copy inhibition information, there is no need of carrying out the decoding process after the array of code data corresponding to the pattern data is exactly obtained. By merely computing the number of pattern images in the block and the ratio, judgement may be made as to if the image is the copy inhibition document, irrespective of the skew and setoff of the image. The judgement processing part can judge as to if the read image is a copy inhibition document, in synchronism with an image signal input from the image reading part 10 and in real time manner during a process ranging from the reading process to the printing process, although the amount of information embedded(it represents only the presence or absence of copy inhibition code) is small.

In the embodiment, judgement is made that it is a copy inhibition document only when at least a predetermined number of the two kinds of copy inhibition codes are detected. Even when the pattern image resembling the copy inhibition code is contained in a normal image, not the copy inhibition image, the judging accuracy may be improved without misjudgement. In an alternative, a pattern image corresponding to one kind of copy inhibition code is embedded in the background image, and judgement is made as to if the image is the copy inhibition image. Even when the pattern images corresponding to the two kinds of copy inhibition codes are embedded in the background image, judgement may be made on the basis of either of the copy inhibition codes. In either case, judgement accuracy will be lowered than in the above-mentioned embodiment, inevitably.

Figure 11:
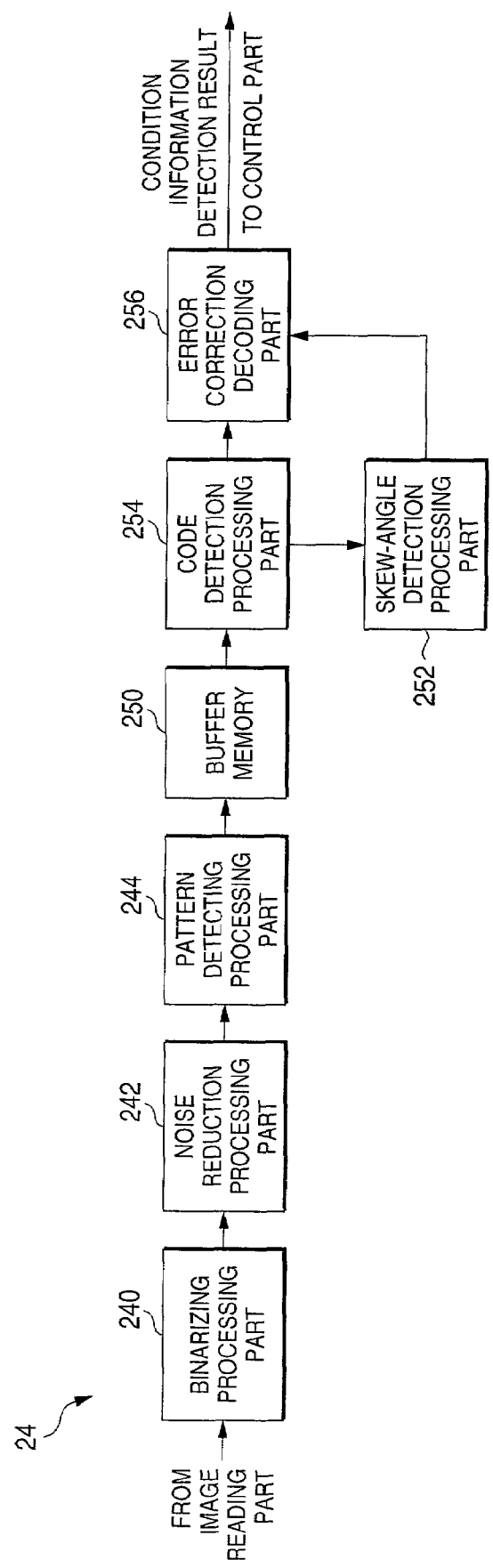
FIG. 11 is a block diagram showing a configuration of a condition information detecting part.

FIG. 11 is a block diagram showing a configuration of the condition information detecting part 24. As shown, the condition information detecting part 24, like the copy inhibiting information detecting part 22, includes a doubling processing part 240 for binarizing input image data, a noise reduction processing part 242 for reducing the noise component of the binary image data output from the doubling processing part 240, and a pattern detecting part 244, and a pattern detecting part 244 for detecting a pattern image on the basis of the binary image data of which the noise component is reduced by the noise reduction processing part 242.

The condition information detecting part 24 includes a buffer memory 250 as one form of the storage part for storing the detection result of the pattern detecting part 244, and a skew-angle detection processing part 252 for obtaining a skew angle as an inclination of the condition code array part with respect to the reference of the image layout on the basis of the data read out from the buffer memory 250. The condition information detecting part 24 includes a code detection processing part 254 and an error correction decoding part 256.

The code detection processing part 254 detects a two-dimensional code based on the data read out of the composite image generating part 50 and the skew angle output from the skew-angle detection processing part 252, and develops the detected two dimensional code into bit trains according to predetermined rules. The error correction decoding part 256 applies the predetermined error correction decoding process to the bit trains of the two-dimensional code, which is detected and developed by the code detection processing part 254, to thereby decode the bit trains into condition information.

Figure 12:
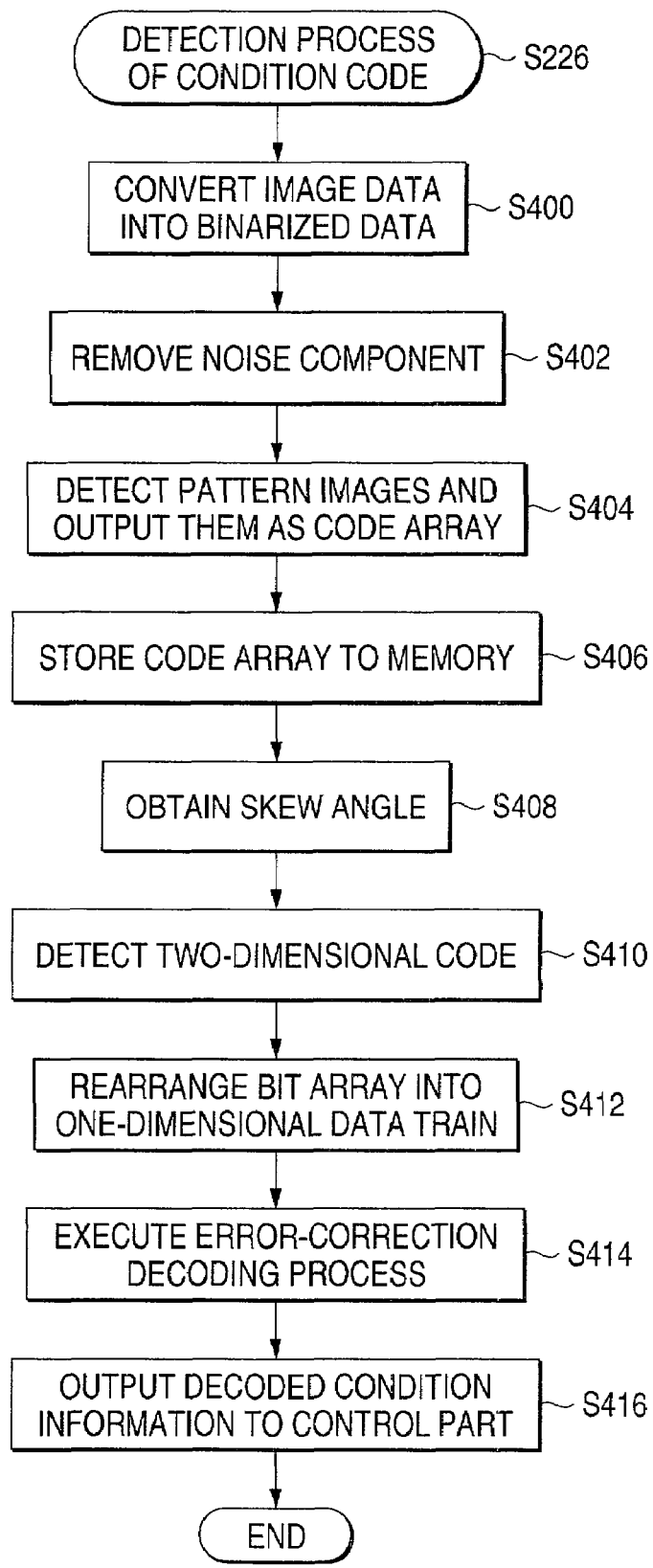
FIG. 12 is a flow chart exemplarily showing a processing procedure in the condition information detecting part.

FIG. 12 is a flow chart exemplarily showing a processing procedure (corresponding to the step S226) in the condition information detecting part 24. The processes of a binarizing processing part 240, noise reduction processing part 242 and a pattern detecting part 244 are similar to those of the corresponding functional parts in the copy inhibiting information detecting part 22 (steps S400 to S404) (The details of them are omitted.).

The pattern detecting part 244 stores the code arrays of "0", "1" and "2" as the detection result to the buffer memory 250 (step S406). The code arrays stored in the buffer memory 250 are such that data at a position where the pattern image shown in FIG. 5(D) corresponding to the code data "0" is detected is "0", and data at a position where the pattern image shown in FIG. 5(D) corresponding to the code data "1" is detected is "1". In other cases than the above ones, the stored code arrays are the code arrays of which one pixel consists of two bits.

The skew-angle detection processing part 252 obtains a skew angle of the input image data, in particular the condition code array part, on the basis of the code array (image data) stored in the buffer memory 250, and inputs the obtained skew angle to the code detection processing part 254 (step S408). Specifically, the skew-angle detection processing part 252 obtains a skew angle in a manner that it Hough transforms the pixels of which the code data (pixel value) is "0" or "1", and obtains a peak of a projection distribution to the angle axis. A technique for obtaining the skew angle, which utilizes the Hough transformation, is known, and hence, the detailed description of it is omitted here.

The code detection processing part 254 reads out the code array (image data) stored in the buffer memory 250, and detects the two-dimensional code from the condition code array part, referring to the skew angle detected by the skew-angle detection processing part 252 (step S410). For example, the code detection processing part 254 scans the image along the skew angle obtained by the skew-angle detection processing part 252 to take out data of "0" or "1" (corresponding to "1" of code data). And it finds synchronizing code from the data trains taken out. The synchronizing code is defined as such a code that the outer periphery of a square area having given vertical and horizontal sizes consists of "1s". The bit array enclosed by the synchronizing code is a two-dimensional code (condition code).

The code detection processing part 254 rearranges the bit array into a one-dimensional data train (bit train), and outputs the resultant to the error correction decoding part 256 (step S412). The error correction decoding part 256 applies a given error-correction decoding process to the bit train received from the code detection processing part 254 (step S414), and decodes it into condition information based on the order of the pattern images are arranged, and outputs the decoded condition information to the control part 32 (step S416).

As described in connection with FIG. 8, the control part 32 permits or stops the copying operation on the basis of the condition information as input from the error correction decoding part 256. When the image is a copy inhibition document containing the condition information, the control part 32 analyzes the condition information and compares the contents of the condition information with the information registered in the internal memory. When those pieces of information are coincident with each other, the control part permits the copying operation (NO to S232, S234, S236, and S212). When those pieces of information are not coincident with each other, the control part prohibits the copying operation (YES to S232, S234, S236, and S210).

The condition information detection process utilizes the copy inhibition code of plural kinds (two kinds in the previous instance) of copy inhibition codes, and expresses the condition by the combination of their arrays. The condition information detecting part 24 executes in synchronism with the image signal as input from the image reading part 10 and in real time, at least the following processes: binarizing process, noise reduction process, pattern detection process, and the process of storing of the pattern detection result to the buffer memory.

In the embodiment mentioned above, the composite image generating part 50 and the image formation part 90 are assembled into the housing of the complex machine 3. In an alternative, the composite image generating part 50 is contained in one housing, and the image formation part 90 is contained in another housing. In this case, the composite image generating part 50 generates the background image by utilizing the pattern images, and composes the background image and the document image, and transfers the composed image to the image formation part 90 or via the network 9 or directly. In turn, the composed image is printed out. The former case via the network 9 is called a case where the invention is applied to the network printer.

In the embodiment, the background image and the document image are generated having equal size, and are composed into the image as the whole document image. In alternative, the background image is generated having a size smaller than the document image, and the background image is incorporated into the document image, as a part of the document image. In this case, the background image may be incorporated into an important part of the document image. When the background image is incorporated into an important part of the document image, the deletion of the copy inhibition code and the condition code, which are contained in the background image, is made difficult. Therefore, such an illicit copy that those pieces of information composed in advance is deleted, and then the document is copied, is prevented. The background image may be incorporated into a predetermined location in the upper part or the lower part of the document image.

As described above, in the arrangement and process of the first embodiment, the control information for controlling the copying operation is allotted to the pattern images. Those pattern images are arranged into a two-dimensional array according to predetermined rules. Therefore, when the copying operation is performed, the illicit copying is efficiently prevented.

Such a first code (copy inhibition code in the previous instance) that the amount of information to be embedded is small, but it may be detected in real time, and such a second code (condition code in the previous instance) that real time detection of it is difficult, but the amount of information is large are repeatedly embedded into the background image by the utilization of the pattern images corresponding to the codes. The copy inhibition information is assigned to the first code, and the removing condition for the copy inhibition is assigned to the second code. In this way, the copying operation may be controlled flexibly.

In the "normal copy mode" of the copying machine, when the copy inhibition code is detected from the image as read, the illicit copying of the confidential document can be prevented without reducing the copying productivity of the copying machine, by stopping the copying operation. When the condition code is detected from the image as read, and it is satisfied, the "condition copy mode" permitting the copying operation is set up. When the condition that a specific user will copy or that preset date and time are past, is satisfied, the copying operation is permitted. The complicated copy controls may be automatically performed without bothering the user.

Further, the first and second codes are repeatedly arranged as corresponding pattern images in the entire background image of the document image. As a result, the deletion of the control information for controlling the copying operation is made difficult, thereby reliably preventing the illicit copy.

When the latent image is contained, the two codes are formed as a part of the background image which functions like the anticopy/counterfeit sheet. Therefore, if the document is copied by using the copying machine not having the detecting function, the warning characters appears in the copied document. Therefore, the user recognizes that the copied document is confidential. Also in the copied document, the control information for copy inhibition, which is made to correspond to the code, is reliably left.

Figure 13:
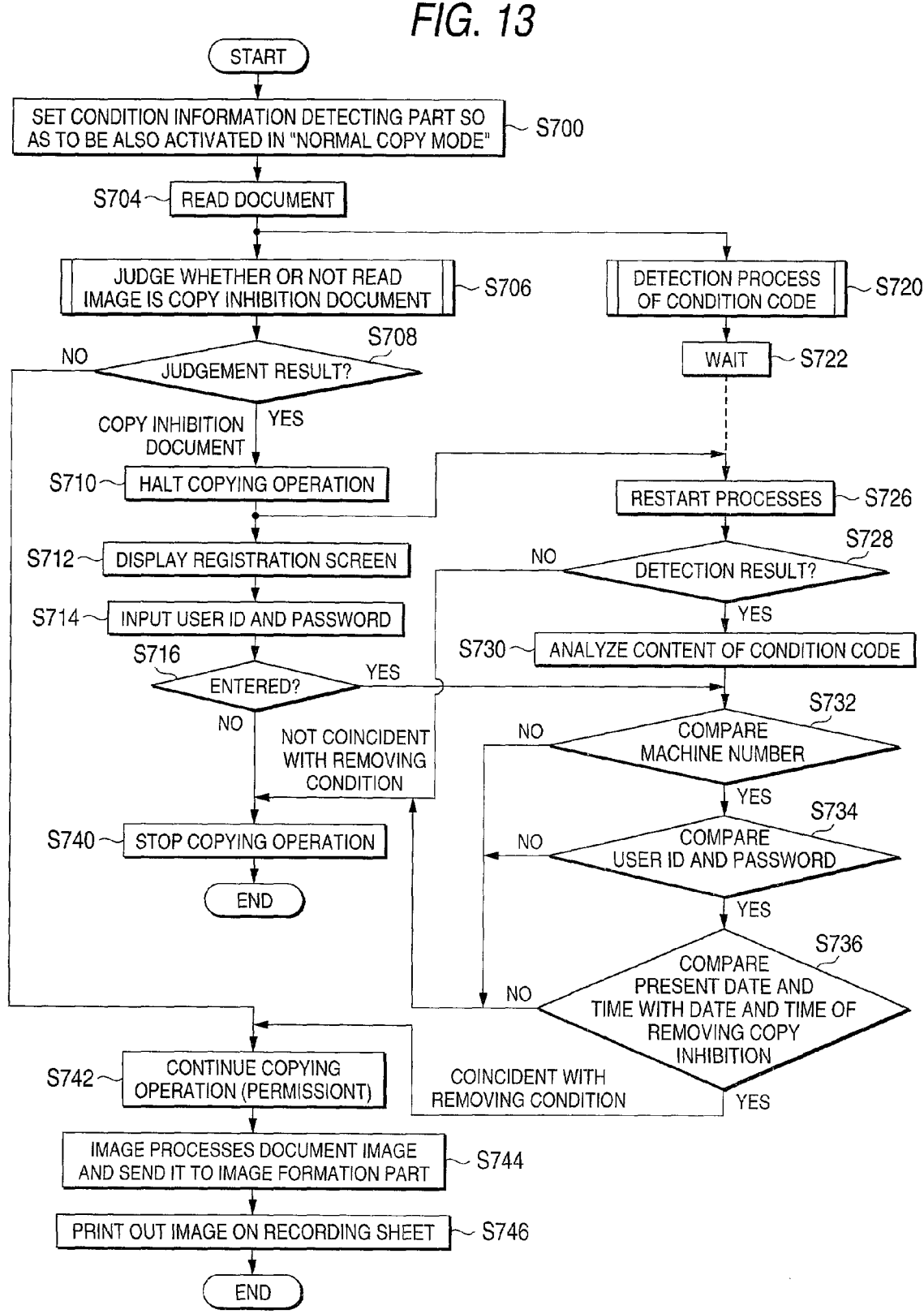
FIG. 13 is a flowchart showing another example of the image outputting processing performed by a control part.

FIG. 13 is a flowchart showing another image output process performed by the control part 32. This processing is hereafter referred to as a second embodiment.

In the first embodiment, the background image was synthesized with PDL data received from the client terminal 2, and the synthesized image was printed. Further, the condition code has been detected only in the "condition copy mode". In the second embodiment, when the copy inhibition code is detected in the "normal copy mode", the condition code detection process is automatically begun so as to perform the copying operation in accordance with the contents of the detected condition code. The configuration of the complex machine 3 is the same as in the first embodiment, and only the operation differs.

The control part 32 sets the condition information detecting part 24 so that it is also activated in the "normal copy mode" (S700). Then, the image reading part 10 scans a document positioned on the platen, stores the obtained document image in the page buffer 26, and transmits the image to the copy inhibition information detecting part 22 and the condition information detecting part 24 (S704).

The copy inhibition information detecting part 22 is only operatable in the "normal copy mode", detects copy inhibition code in the document image obtained by the image reading part 10, judges whether the image to be processed is a copy inhibition document, and transmits the judgement result to the control part 32 (S706). The copy inhibition information detecting part 22 performs this process in real time in synchronization with the reception of an image signal from the image reading part 10. The process performed by the copy inhibition information detecting part 22 is the same as that explained in the first embodiment.

Further, in parallel with the copy inhibition code detection process performed by the copy inhibition information detecting part 22, the condition information detecting part 24 detects the condition code in the document image obtained by the image reading part 10 (S720). During this condition code detection process performed by the condition information detecting part 24, the binarization, the noise removal, the pattern detection and the storage of the pattern detection result in the buffer memory 250 are performed in real time in synchronization with the transmission of an image signal. The detailed processing is the same as that explained in the first embodiment. When the storage of the pattern detection result in the buffer memory 250 is completed, the condition information detecting part 24 waits until an instruction is received from the control part 32 (S722).

The control part 32 controls the output operation based on the judgement result received from the copy inhibition information detecting part 22 (S708). When the judgement result obtained by the copy inhibition information detecting part 22 indicates that the pertinent document is not a copy inhibition document (the copy inhibition code is not detected), the control part 32 permits the select part 80 to transmit the image from the image processing part 40 to the image formation part 90, and continues the copying operation (S708: NO, S742 to S746). When the judgement result indicates that the pertinent document is a copy inhibition document (the copy inhibition code is detected), the control part 32 temporarily halts the copying operation (S708: YES, S710). Then, the control part 32 permits the control panel 34 to display the screen for the entry of the user ID and the password, and at the same time, requests the transmission of the detection result by the condition information detecting part 24 (S712). Thereafter, the control part 32 waits until the entry of the user ID and the password and the reception of the detection result from the condition information detecting part 24 are completed.

Using the screen of the control panel 34, a user enters the user ID and the password (S714), and then notifies the control part 32 that the user ID and the password have been entered (S716). Thereafter, the condition information detecting part 24 reads image data from the buffer memory 250, performs skew angle detection, code detection and error correction and decoding, and outputs the obtained condition information to the control part 32 (S726). The detailed processing is the same as that explained for the first embodiment.

The control part 32 analyses the detection result received from the condition information detecting part 24 (S728). And when the result do not indicates that condition code has been detected, or when the user ID and the password have not been entered, even after a predetermined time has elapsed, it is assumed that the condition for removing the copy inhibition is not present and the control part 32 halts the copying operation (S728: NO, S740).

When, however, the result indicates that condition code has been detected (S728: YES), the control part 32 analyses the contents of the condition code, and specifies corresponding condition information (S730). Then, the control part 32 compares, with the registered data stored in the internal ROM, the machine number represented by the condition code or the user ID and the password that have been entered, or compares the inhibition removing time and day with the current time and day obtained from the internal timer, and controls the copying operation in accordance with the comparison results (S732 to S736). The detailed comparison process is the same as that as explained for the first embodiment.

As is described above, even in the "normal copy mode" the condition code detection process is automatically activated, as needed. Therefore, when a pattern image representing the copy inhibition code is included in an image obtained by scanning, and when the copy inhibition information detecting part 22 detects this pattern image, the copying operation is temporarily halted and is resumed only when a predetermined condition that has been registered in advance is established. Therefore, the copying operation will be permitted only when the predetermined condition is satisfied. When the copying operation is temporarily halted, and when a pattern image representing condition code is not included, or when, even after a predetermined time has elapsed, the user ID and the password have not been entered the copying operation can be inhibited. Further, when a pattern image representing the copy inhibition code is not included, the scanned image can be printed on a sheet. In this manner, the normal copying operation can be performed.

Figure 14:
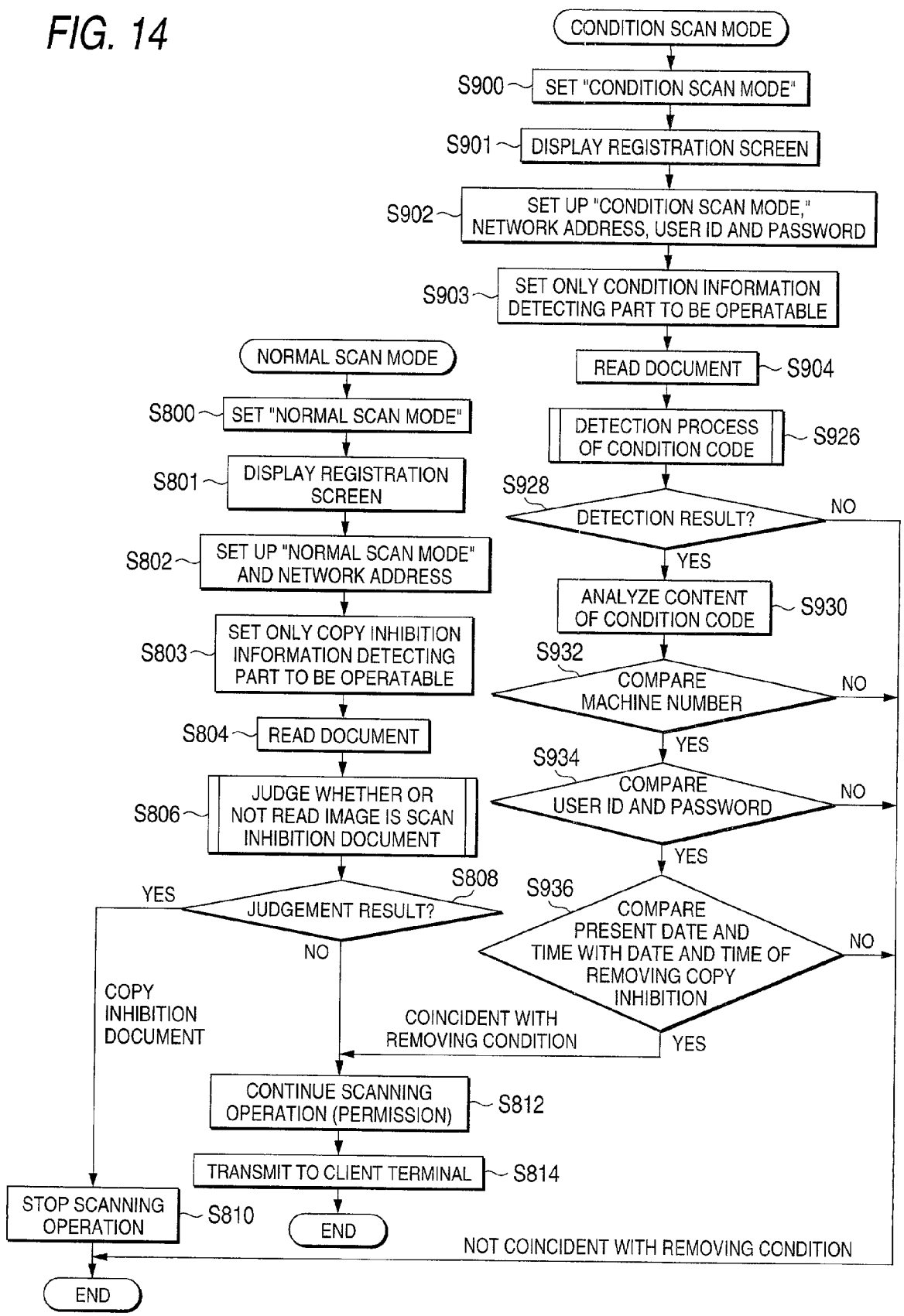
FIG. 14 is a flowchart showing another example of the image outputting processing performed by the control part.

FIG. 14 is a flowchart showing another example of image printing processing performed by the control part 32. This configuration is hereinafter referred to as a third embodiment.

In the first and the second embodiments, the complex machine for controlling the copying operation upon the detection of copy inhibition code and condition code has been employed. In the third embodiment, the present invention is applied for a so-called network scanner, and an image obtained by the image reading part 10 of the complex machine 3 is transmitted to the client terminal 2 connected by a network. The configuration of the complex machine 3 is the same as that for the first embodiment, and only the operation thereof differs.

For the complex machine 3 of the third embodiment, two types of scan modes, the "normal scan mode" and the "condition scan mode", can be set, and different operations can be performed in accordance with the scan mode that is designated. The mode switching can be implemented when the control part 32 receives a user instruction through the control panel 34, and controls the copy inhibition information detecting part 22, the condition information detecting part 24 or the composite image generating part 50. The copy inhibition information detecting part 22 can be set so that it is activated only in the "normal scan mode" and is not activated in the "condition scan mode", while the condition information detecting part 24 can be set so that it is activated only in the "condition scan mode", and is not activated in the "normal scan mode".

First, the processing performed in the "normal scan mode" will be explained. The user selects the "normal scan mode" by manipulating the control panel 34 of the complex machine 3 (S800), and upon receiving this instruction, the control part 32 permits the control panel 34 to display the screen for the entry of the network address data for a transmission destination (client terminal 2) of the scanned image (S801) The user enters the network address data using the screen (S802)

Thus, notification of the set up of the "normal scan mode" is transmitted to the control part 32, along with the network address data for the transmission destination. The control part 32 then permits the copy inhibition information detecting part 22 to be activated, and prevents the activation of the condition information detecting part 24 (S803).

Next, the image reading part 10 scans a document positioned on the platen and stores the obtained document image in the page buffer 26. It also transmits the document image to the copy inhibition information detecting part 22 and the condition information detecting part 24 (S804).

The copy inhibition information detecting part 22, which can be operated only in the "normal scan mode", detects copy inhibition code in the document image obtained by the image reading part 10, judges whether the image to be processed indicates a copy inhibition document, and transmits the judgement result to the control part 32 (S806). In this case, the copy inhibition information detecting part 22 performs the process in real time in synchronization with an image signal received from the image reading part 10. The details of the copy inhibition code detection processing are the same as those provided for the first embodiment.

The control part 32 provides control for the output operation based on the judgement result received from the copy inhibition information detecting part 22 (S808). When the judgement result received from the copy inhibition information detecting part 22 indicates that a document is a copy inhibition document (the copy inhibition code is detected), the control part 32 halts the scanning operation (S808: YES, S810). "Halts the scanning operation" means that a scanning operation that is currently being performed is immediately halted, or that, when the scanning has been completed, the transmission of the scanned image to the client terminal 2 is prevented.

When the judgement result indicate that the image to be processed is not a copy inhibition document (the copy inhibition code is not detected), the control part 32 continues the scanning operation (S812), reads image data from the page buffer 26, and transmits to the client terminal 2 the image data that is consonant with the network address data that is designated (S808: NO, S814). The scanning operation is thereafter terminated.

As is described above, in the "normal scan mode", when a pattern image representing the copy inhibition code is included in a document image obtained by the image reading part 10, the copy inhibition information detecting part 22 can detect the pattern image, and the transmission of the obtained image to the client terminal 2 can be inhibited. When the pattern image representing the copy inhibition code is not included in the document image, the document image can be transmitted to the client terminal 2, so that the normal function of the network scanner can be initiated.

The processing performed in the "condition scan mode" will now be described. First, the user selects the "condition scan mode" by manipulating the control panel 34 of the complex machine 3 (S900). Upon receiving this instruction, the control part 32 permits the control panel 34 to display the screen for the entry of the network address data for the transmission destination (client terminal 2) of the scanned image, the user ID and the password (S901), and a user uses this screen to enter the user ID and the password (S902). Thus, notification is transmitted to the control part 32 of the setting up of the "conditioned scan mode", the network address data for the transmission destination and the user ID and the password that have been entered. The control part 32 then prevents the activation of the copy inhibition information detecting part 22 and permits the activation of the condition information detecting part 24 (S903).

Following this, the image reading part 10 scans a document placed on the platen and stores the obtained document image in the page buffer 26. It also transmits the document image to the copy inhibition information detecting part 22 and the condition information detecting part 24 (S904).

The condition information detecting part 24, which can be operated only in the "condition scan mode", detects condition information in the document image obtained by the image reading part 10, and transmits the detection result to the control part 32 (S926). In this case, the condition information detecting part 24 performs binarization, noise removal and pattern detection, and stores the pattern detection result in the buffer memory in real time and in synchronization with the image signal.

The condition information is data representing a condition that permits the scanning of a document, and includes the password (PIN code) and the user ID number (employee number) of a user who is permitted to perform copying, the time and day for the removal of the copy inhibition, and the machine number of a complex machine that is allocated for the scanning. The details of the condition information detection process are basically the same as those provided for the first embodiment, with the exception that the condition information is related to the transmission of the scanned image, rather than to the printing of the scanned image.

The control part 32 analyzes the detection result received from the condition information detecting part 24 (S928), and when the detection result does not indicate that condition code has been detected, the control part 32 halts the scanning operation and prohibits the transmission of the obtained image to the client terminal 2 (S928: NO, S810).

When the detection result indicate that condition code has been detected (S928: YES), the control part 32 analyzes the condition code and specifies corresponding condition information (S930).

The control part 32 compares the machine number represented by the condition code with each registered machine number that is stored in the internal ROM of the control part 32 (S932). When the detected machine number matches one of the registered machine numbers (S932: YES), the control part 32 compares the user ID and the password that have been received from the control panel 34 with each registered user ID and each registered password that are stored in the internal ROM (S934). When the user ID matches one of the registered user IDs and the registered password corresponding to this registered user ID matches the password that has been entered (S934: YES), the control part 32 reads the current time and day from the internal timer, and compares them with the time and day that are represented by the condition code for removing the scan inhibition (S936). And when the time and day for the removal of the scan inhibition have been reached, the control part 32 continues the scanning operation. That is, the control part 32 reads image data from the page buffer 26 and transmits the image data to the client terminal 2 that corresponds to the network address data that has been set (S936: YES, S812, S814).

When the comparison condition is not established (is not matched/the time has not elapsed) through the comparison of the machine numbers, the comparison of the user IDs and the password (NO at S934) or the comparison of the inhibition removal time and day, the scanning operation is halted (S932: N0, S934: NO, S936: NO, S810).

As is described above, in the "condition scan mode", when a pattern image representing condition code is included in a document image obtained by the image reading part 10, the condition information detecting part 24 can detect the pattern image. Therefore, only when a predetermined condition that has been registered in advance is established, the transmission of the obtained image to the client terminal 2 can be permitted. When the pattern image representing the condition code is not included in an obtained document image, the image can be transmitted, which enables the normal function of the network scanner to be performed.

In the third embodiment, the network-connected complex machine 3 reads a document, and distributes the document image to the client terminal 2. However, a configuration that functions only as a scanner may be employed, i.e., the obtained image may be stored in a predetermined storage medium, or may be transmitted to another application program. Further, the scanner may be located in the vicinity of the client terminal, and may transmit an image to a printer connected by a cable or by short-distance radio communication means, such as Bluetooth, so that the image can be printed by the printer.

Figure 15:
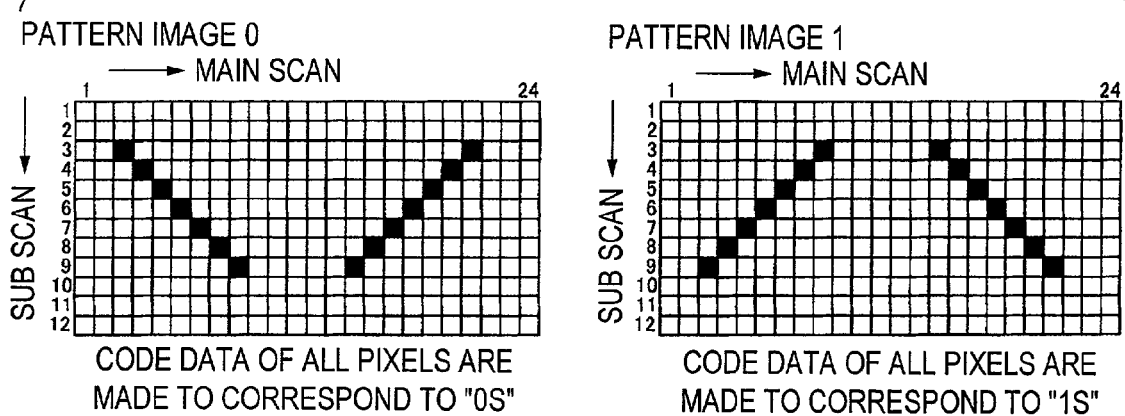
FIGS. 15(A) to 15(C) are diagrams exemplarily showing other pattern images.
Figure 15:
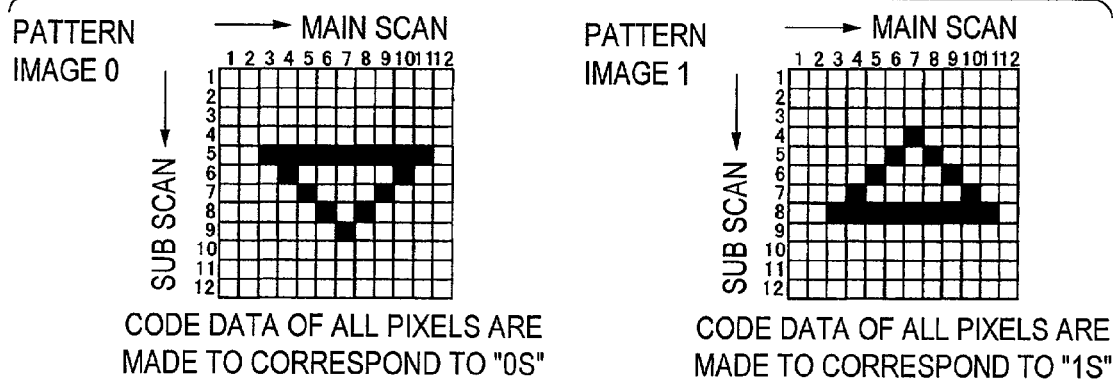
Figure 15:
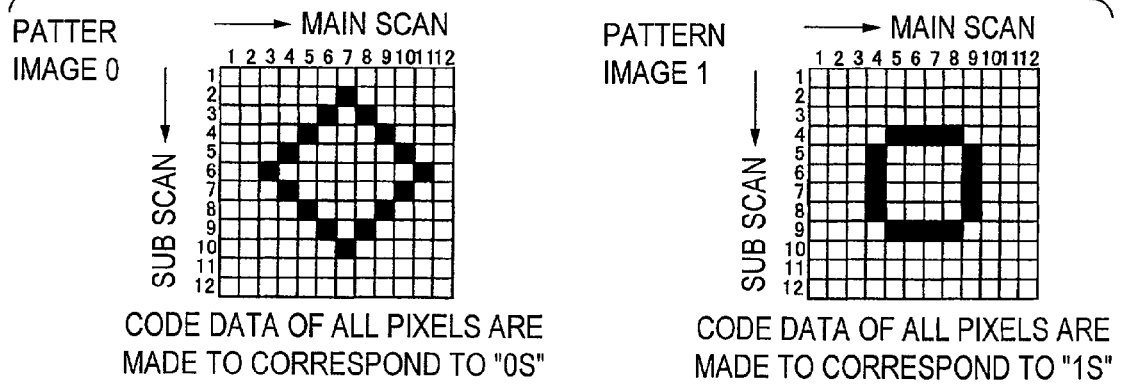

FIGS. 15(A) to 15(C) are diagrams exemplarily showing other pattern images. In the first embodiment, the pixel size of the one pattern image is the square size of 12 (vertical)×12 (horizontal) pixels. However, the size is not limited to that of the former, but may be the square size or the rectangular size of another dimension. In a case of the rectangular size, as shown in FIG. 15(A), the size may be defined by 12 (vertical)×24 (horizontal) pixels by utilizing the pattern images for the above-mentioned two copy inhibition codes.

Also in this case, as shown in the figure, the pattern features are made different, and the numbers of the black pixels of the patterns are made substantially equal to one other so that plural kinds of the copy inhibition codes can be expressed. Patterns are not limited to the oblique line pattern, but may be a pattern having such a feature quantity of a pattern, which is represented by a direction of an array of black pixels as to be expressed by a linear function or a combination of the linear function and the quadratic function. Example of the pattern is a figure presenting a linear line, square, circle, ellipsis or the like, such as a triangle shown in FIG. 15(B) or a rectangle close to a circle shown in FIG. 15(C). The number of kinds of the pattern images representing the copy inhibition codes is not limited to two, but may be three or larger, as a matter of course.

Figure 16:
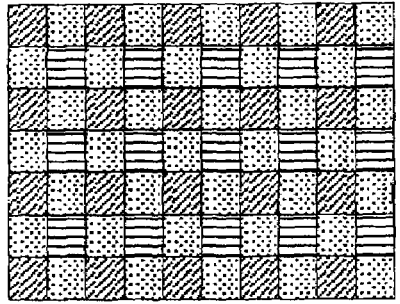
FIGS. 16(A) to 16(F) are diagrams exemplarily showing another case where the unit two-dimensional arrays of the copy inhibition code array and the condition code array are repeatedly arrayed over the entire original image.

FIGS. 16(A) to 16(F) are diagrams exemplarily showing another case where the unit two-dimensional arrays of the copy inhibition code array and the condition code array are repeatedly arrayed over the entire original image. The array pattern of FIG. 7(A) is shown in FIG. 16(A), and its simple representation is shown in FIG. 16(B), for the purpose of comparison. In the first embodiment, two kinds of the unit two-dimensional arrays of the copy inhibition code array consisting of "0s" and "1s" and the unit two-dimensional array of the condition code array consisting of "0/1s", are repeatedly arrayed over the entire image. As shown in FIG. 16(C), one of the unit two-dimensional arrays of "0s" and "1s" and the unit two-dimensional array of the condition code array consisting of "0/1s" may repeatedly be arrayed over the entire image.

In an alternative, as shown in FIG. 16(D), only one of the unit two-dimensional array of "0s" and "1s" may repeatedly be arrayed over the entire image. In this case, actually, the unit two-dimensional array is not repeatedly arrayed over the entire image, exactly. However, the fact that the pattern image representative of the copy inhibition code is arrayed into a two-dimensional fashion at fixed intervals, remains unchanged. In a case where pattern images corresponding to plural kinds of copy inhibition codes, are utilized, a combination of pattern image arrays maybe utilized for a judging process. Therefore, a chance of misjudgment is lessened. In a case where a pattern image corresponding to one kind of copy inhibition code is utilized, the judging process is simplified, and hence, the copying productivity of the copying machine is improved.

The pattern number array patterns as shown in FIGS. 16(E) and 16(F) may be employed: scan lines consisting of "0s" and "1s" are alternately arranged in the vertical (sub-scan) direction, which is orthogonal to the scan line direction.

In the cases of FIGS. 16(D) to 16(F), the unit two-dimensional array of the condition code array is not arranged, but it may be arranged appropriately and dispersively. In this case, the number of the unit two-dimensional array to be arranged may be one to three, but some large number is preferable. The reason for this is that even if the condition code is partially lost due to the embedding of the latent image character and the superimposing it on the original image, the embedded removal condition can be decoded with high precision.

Figure 17:
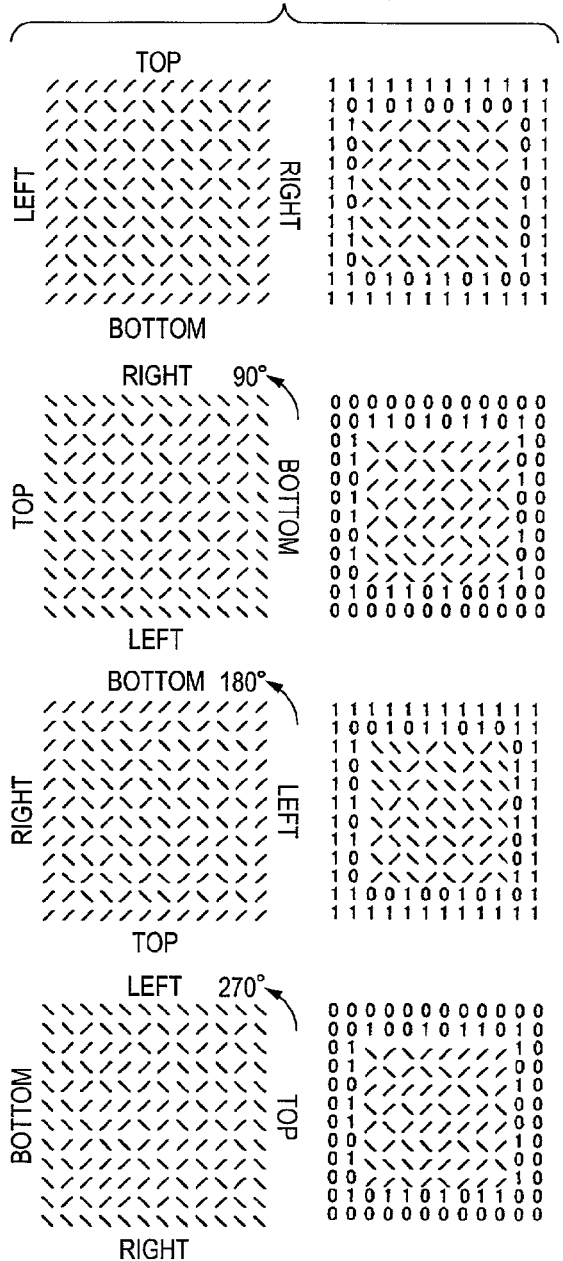
FIGS. 17(A) to 17(C) are diagrams useful in explaining a relation of synchronizing codes embedded in the periphery of the condition code array and a decoding process.
Figure 17:
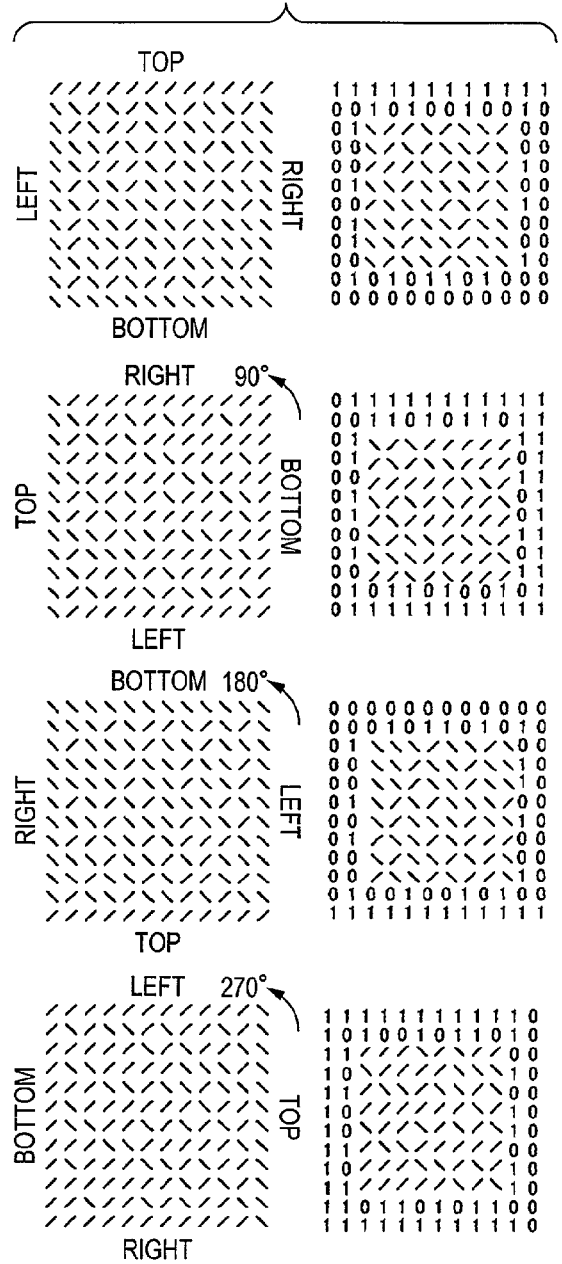
Figure 17:
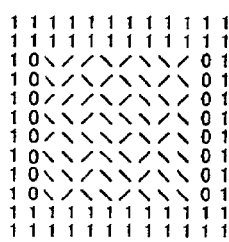

FIGS. 17(A) to 17(C) are diagrams useful in explaining a relation of synchronizing codes embedded in the periphery of the condition code array and a decoding process. FIG. 17(A) shows the condition code array in the first embodiment; and FIGS. 17(B) and 16(C) show other condition code array.

In the first embodiment, the outermost periphery of the condition code array of the unit two-dimensional array is enclosed by "1s", and the condition code is encoded into two dimensional array, and pattern images corresponding to "1s" and "0s" are arranged within the inside of the outermost periphery. In this case, in some pattern images, the image reader sometimes fails to detect the synchronizing code depending on how the document is placed on the document table, and in this case, a position or an inclination (skew angle) of the condition code array, is not specified. Further, the following disadvantage occurs. The image reader can detect the synchronizing code, but the top, bottom, right and left sides of the condition code arrays are not specified, and decoding error occurs in the decoding process of the condition code.

For example, as shown in FIG. 17(A), in the case of the condition code array of the first embodiment utilizing the oblique line pattern, the synchronizing code is detected when the condition code array is rotated by 180°, but the top and bottom sides thereof are not specified. Accordingly, at the time of decoding the condition code, the inner data array changes, and in this state, the decoding is performed, leading to decoding error. When the condition code array is rotated by 90° or 270°, the code data of outermost periphery is changed to "0s" from "1s" at the time of detection. In this case, it can be judged if the condition code array is turned 90° to the right or left, but the turning direction, right or left, cannot be specified. The result is that the synchronizing code cannot be detected, or the condition code array cannot be found. Such occurs not only in the case where the oblique line patterns are utilized and the outermost periphery of the code array is filled with "1s", but also in the case where the oblique line patterns are utilized and the outermost periphery of the code array is filled with "0s". The same occurs also in a case where when the code array is turned 90°, the code data is inverted.

To cope with this, in the case of utilizing such image patterns, code data of one of the top, bottom, right and left sides is preferably made different from code data of the other three sides. For example, as shown in FIG. 17(B), "1s" are assigned to the top side, and "0s" are assigned to the bottom, right and left sides. If so assigned, when the code array is rotated by 180°, "1s" are located at the bottom side and are detected. Accordingly, the top and bottom sides are reversed for the judgement. The code data per se in the inside remains unchanged. When the code array is rotated by 90°, one of the right and left sides is detected to be "0s", and the other side is detected to be "1s". Therefore, which direction, right and left, of the code array 90° rotation is specified. In this case, the inside code data is detected in the inverted state. Therefore, the top, bottom, right and left sides are reliably detected, and the decoding error is prevented from occurring by adjusting rearrangement of the data (including reversing of "0s" and "1s") in the decoding process of the condition code depending on how the document is placed.

As shown in FIG. 17(C), the synchronizing codes may be assigned to the location adjacent to and on the inner side of the outermost periphery. In this case, those synchronizing code is made different from that of the outermost periphery. The same data is assigned to the upper and lower sides, and to the right and left sides, but different data codes are assigned to the upper (lower) and right (left) sides. Description of the rotation of the document placement, and the detection result of the code data is omitted. Also in this case, detection of the top, bottom, right and left sides are ensured. Further, decoding error can be prevented in a manner that the data rearraying when the condition code is decoded is adjusted depending on the document placing state (the adjustment involves the logic state inversion of "0" to "1" and vice versa).

While the invention has been described using some specific embodiments, it should be understood that the invention may be modified, altered and changed within true spirits and scope of the appended claims. Further, it should be understood that the description of the embodiments do not limit the invention defined in the appended claims, and that all the combinations of characteristic features of the invention as described in the embodiments are not always essential to the means for solving the problems.

As is described above, the present invention may be applied for a system constituted by multiple apparatuses, such as a host computer, an interface device, a scanner and a printer, or for a single apparatus, such as a copier or a facsimile machine.

The effects described in the embodiments can be also achieved when software program code implementing the functions of the embodiments is supplied to a system or an apparatus, and when the computer (a CPU or an MPU) of the system or the apparatus reads and executes the program code in the storage medium. In this case, the functions of the embodiments are provided by the software program code that is read from the storage medium.

In addition, it is not only possible for the functions of the embodiments to be provided through the execution of program code read by a computer, but also for, based on instructions in the program code, an OS (Operating System) running on a computer to execute part or all of the actual processing required to provide the functions described in the embodiments.

Furthermore, program code read from a storage medium can be written in a memory that is mounted on a function expansion card inserted into a computer, or in a function expansion unit connected to the computer, and in consonance with instructions in the program code, a CPU mounted on the function expansion card, or in the function expansion unit, can perform part or all of the actual processing required to implement the functions of the above described embodiments.

As is described above, according to the present invention, an image to be scanned is defined as an image wherein the pattern images are arranged so as to represent control data for inhibiting copying or for removing the inhibition. The code for inhibiting copying, or the code for removing the copy inhibition is assigned for the pattern image.

Further, a user need not be responsible for the high-level copying control. Specifically, when copy inhibition code is detected during the scanning process, copying is automatically halted, or when code for removing the copy inhibition is detected, copying is allowed only within a range designated by the detected condition. As a result, the copying operation can be automatically controlled.

So long as multiple pattern images representing copy inhibition code are represented by using a comparatively simple characteristic value, such as an oblique line pattern, the detection or the determination process performed by a reader can be simplified. Further, the copy inhibition code, which, while only a small amount of this code can be embedded, can be detected in real time, and the condition code, which, while a large amount of this code can be embedded, can not be detected in real time, are repetitively embedded as oblique line patterns in the background of a document image. In the "normal copy mode" of the copier, the copy prohibit code in the obtained image is detected, and upon the detection of this code, the copying operation is halted. As a result, the unauthorized copying of a confidential document can be prevented without the productivity of the copier being reduced.

In addition, another copy mode is provided wherein the copying operation is permitted when the condition code in the obtained image is detected and a condition is established. Therefore, when a condition, such as permitting a specific user to perform copying or the elapse of a predetermined day and time delimited period, is established, a complicated copy operation, such as permitting copying, can be performed automatically, without user manipulation being required.

What is claimed is:

1. An image reader for reading a document and for controlling an output of an image that is read, comprising:
   an image reading part that reads the document;
   an inhibition information pattern image detecting part that detects inhibition information pattern images that are included in the image obtained by the image reading part and that represents the inhibition of the output of the image;
   a condition information pattern image detecting part that detects condition information pattern images (i) which are included in the image obtained by the image reading part and (ii) which remove the inhibition of the output of the image;
   an operating mode instruction part that instructs switching between a normal operating mode and a condition operating mode based on a user's instruction; and
   a controller,
   wherein the controller, in the normal operating mode, causes the condition information pattern image detecting part not to detect the condition information pattern images,
   wherein the controller, in the normal mode, inhibits the output of the image under a condition in which the inhibition information pattern images are detected by the inhibition information pattern image detecting part;
   wherein the controller, in the condition operating mode, causes the condition information pattern image detecting part to detect the condition information pattern images, and permits the output of the image if (i) the condition information pattern image is detected by the condition information pattern detecting part and (ii) the detected condition information pattern images which satisfy a condition that is defined in advance for removing the inhibition of the output of the image,
   wherein, in the normal mode, detecting the inhibition information pattern images directly leads to a cancel of the output of the image,
   wherein said detecting the inhibition information pattern images is performed on in the normal mode, and
   wherein said detecting the condition information pattern images is performed only in the condition operating mode.

2. An image reader according to claim 1, wherein the inhibition information pattern images are included in an inhibition information image area having a predetermined size, the inhibition information pattern images that are correlated with code data that is detectable during the output of the image being two dimensionally arrayed at predetermined spatial intervals so as to express an inhibition information; and
   wherein, based on at least one of the number of the inhibition information pattern images and the ratio of the inhibition information pattern images that are included in the inhibition information image area, the inhibition information pattern image detecting part examines the code data and detects the inhibition information from the image.

3. An image reader according to claim 2, wherein the inhibition information is represented by repetitively arranging a plurality of the inhibition information image areas in accordance with a predetermined cycle;
   wherein, based on at least one of the number of the inhibition information pattern images and the ratio of the inhibition information pattern images that are included in each of the inhibition information image areas, the inhibition information pattern image detecting part detects the inhibition information and determines the attributes of the inhibition information image areas; and
   wherein, based on the attributes of the inhibition information image areas, the inhibition information pattern image detecting part detects the inhibition information from the image.

4. An image reader according to claim 1,
   wherein plural kinds of the condition information pattern images are included in a condition information image area having a predetermined size, the plural kinds of the condition information pattern images that are correlated with code data that is detectable during the output of the image being two dimensionally arrayed at predetermined spatial intervals so as to express the condition information, and
   wherein, based on the order for arranging the plural kinds of the condition information pattern images that are included in each of the condition information image area, the condition information pattern image detecting part examines the code data and detects the condition information from the image.

5. An image reader according to claim 4, wherein the condition information is represented by repetitively arranging a plurality of the condition information image areas in accordance with a predetermined cycle;
   wherein, based on the order for arranging the plural kinds of pattern images that are included in each of the condition information image areas, the condition information pattern image detecting part detects the condition information and determines the attributes of the condition information image areas; and
   wherein, based on the attributes of the condition information image areas, the condition information pattern image detecting part detects the condition information from the image.

6. A copier comprising:
   an image reader according to claim 1; and
   an image formation part for forming a visible image based on an image read by the image reader,
   wherein, based on detection results obtained by the inhibition information pattern image detecting part and condition information pattern image detecting part, the controller controls at least one of the reading operation of the image reader and the image forming operation of the image formation part.

7. A computer readable medium storing a program causing a computer to execute a process for reading a document and for controlling an output of an image that is read, the process comprising:

instructing switching between a normal operating mode and a condition operating mode based on a user's instruction, in the normal operating mode, causing a condition information pattern image detecting part not to detect condition information pattern images, and inhibiting the output of the image if inhibition information pattern images are detected by an inhibition information pattern image detecting part, and in the condition operating mode, causing the condition information pattern image detecting part to detect the condition information pattern images, and permitting the output of the image if a removing condition is detected by executing a pattern detection process on the condition information pattern images detected by the condition information pattern image detecting part, wherein the removing condition satisfies a condition that is defined in advance for removing the inhibition of the output of the image, wherein the condition information pattern images are indicative of a condition to permit image reading wherein the causing to detect the inhibition information pattern images directly leads to a cancel of the output of the image, wherein the causing to detect the inhibition information pattern images is performed only in the normal mode, and wherein the causing to detect the condition information pattern image is performed only in the condition operating mode.

8. An image reader for reading a document and for controlling an output of an image that is read, comprising:

an image reading part that reads the document;

an inhibition information pattern image detecting part that detects inhibition information pattern images that are included in the image obtained by the image reading part and that represents the inhibition of the output of the image;

a condition information pattern image detecting part that detects condition information pattern images (i) which are included in the image obtained by the image reading part and (ii) which remove the inhibition of the output of the image;

an operating mode instruction part that instructs switching between a normal operating mode and a condition operating mode based on a user's instruction; and a controller, wherein the controller, in the normal operating mode, causes the condition information pattern image detecting part not to detect the condition information pattern images, wherein the controller, in the normal mode, inhibits the output of the image under a condition in which the inhibition information pattern images are detected by the inhibition information pattern image detecting part;

wherein the controller, in the condition operating mode, causes the condition information pattern image detecting part to detect the condition information pattern images, and permits the output of the image if (i) the condition information pattern image is detected by the condition information pattern detecting part and (ii) the detected condition information pattern images which satisfy a condition that is defined in advance for removing the inhibition of the output of the image, wherein the inhibition information pattern images are included in an inhibition information image area having a predetermined size, the inhibition information pattern images that are correlated with code data that is detectable during the output of the image being two dimensionally arrayed at predetermined spatial intervals so as to express an inhibition information; and wherein, based on at least one of the number of the inhibition information pattern images and the ratio of the inhibition information pattern images that are included in the inhibition information image area, the inhibition information pattern image detecting part examines the code data and detects the inhibition information from the image, and wherein the inhibition information pattern images and the condition information pattern image are arrange without a gap in an entire background image of the document.

* * * * *